(12) United States Patent
Dreszer

(10) Patent No.: US 6,442,661 B1
(45) Date of Patent: Aug. 27, 2002

(54) SELF-TUNING MEMORY MANAGEMENT FOR COMPUTER SYSTEMS

(75) Inventor: Timothy Dreszer, Santa Cruz, CA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/515,416

(22) Filed: Feb. 29, 2000

(51) Int. Cl.$^7$ .................. G06F 12/02; G06F 12/00; G06F 12/08
(52) U.S. Cl. ............. 711/170; 711/171; 711/133; 711/159; 711/160; 707/205
(58) Field of Search .................. 711/170, 171, 711/133, 159, 160; 707/205

(56) References Cited

U.S. PATENT DOCUMENTS

| | | | |
|---|---|---|---|
| 5,075,848 A | | 12/1991 | Lai et al. .................. 395/425 |
| 5,408,650 A | * | 4/1995 | Arsenault .................. 395/704 |
| 5,930,827 A | * | 7/1999 | Sturges .................. 711/170 |

OTHER PUBLICATIONS

Hanson D.R., "Fast Allocation and Deallocation of Memory Based on Object Lifetimes", *Soft Practice and Experience*, John Wiley & Sons, Ltd., vol. 20, No. 1. Jan. 1990, pp. 5–12.

Barrett D.A. and Zorn B.G., "Using Lifetime Predictors to Improve Memory Allocation Performance"*ACM SIG–Plan Notices*, "Online!", vol. 28, No. 6, 1993 pp. 187–196.

Boehm H–J and Weiser M., "Garbage Collection in an Uncooperative Environment", *Software Practice And Experience*, John Wiley & Sons, Ltd., vol. 18, No. 9, Sep. 1988, pp. 807–820.

Seidl M.L. and Zorn B.G., "Segregating Heap Objects by Reference Behavior and Lifetime", *A SIG–Plan Notices*, "Online!", vol. 33, No. 11, Nov. 1998 pp. 12–23.

Lu Xu et al., "Distributed Garbage Collection for the Parallel Inference Machine PIE64", *Proc. Information Processing 89*, San Francisco, Aug. 28–Sep. 1, 1989, pp. 1161–1166.

Cheng P. et al., "Generational Stack Collection and Profile–Driven Pretenuring", *ACM SIG–PL Notices*, vol. 33, No. 5, May 1, 1998 pp. 162–173.

IBM Tech Discl. Bull. vol. 28, No. 4, Sep. 1985 pp. 1684–1686.

\* cited by examiner

*Primary Examiner*—Do Hyun Yoo
*Assistant Examiner*—Mehdi Namazi
(74) *Attorney, Agent, or Firm*—Michael Zarrabian

(57) ABSTRACT

A method of memory management in a computer system comprising memory. The method includes the steps of: in response to requests for allocation of memory blocks that remain allocated for different durations, allocating each memory block from one of a plurality of regions in the memory based on the duration that the memory block is to remain allocated; and maintaining a plurality of memory segments of one or more sizes in the memory, and in response to a request for allocation of a memory block if the requested block size is less than a predetermined size, then allocating the requested block from among said segments, otherwise allocating the requested block from another portion of the memory. The number of data segments are changed in relation to memory requests. Further at least a portion of the memory is allocated to a cache having one or more buffers. The cache buffers can be allocated for non-cache use, including increase the number of said data segments, and are then deallocated back to the cache.

38 Claims, 16 Drawing Sheets

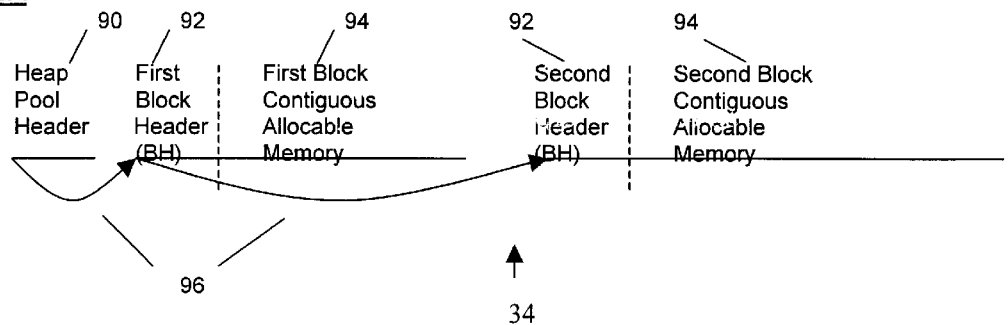
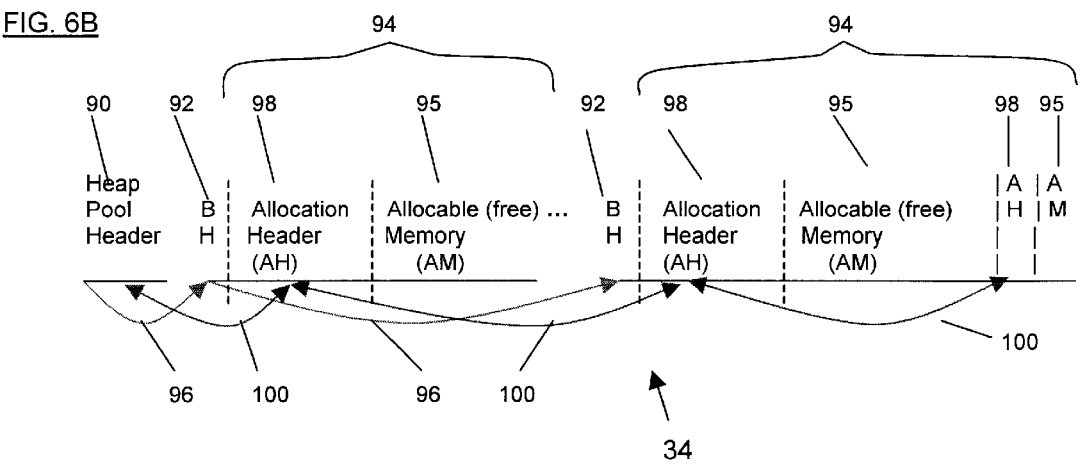
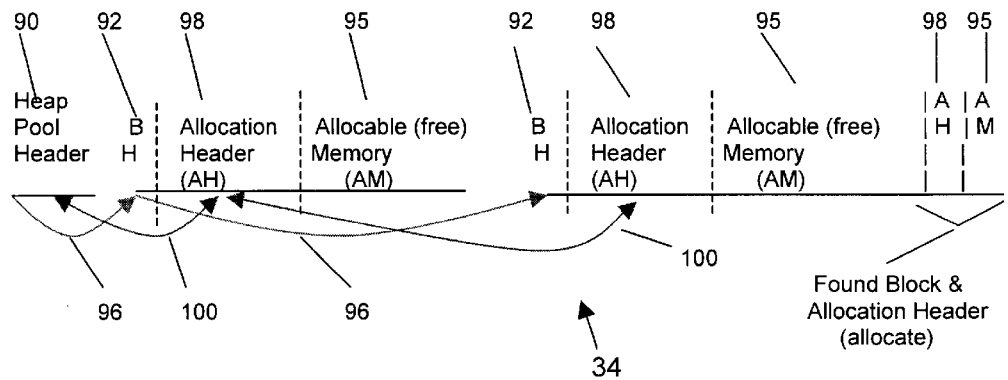

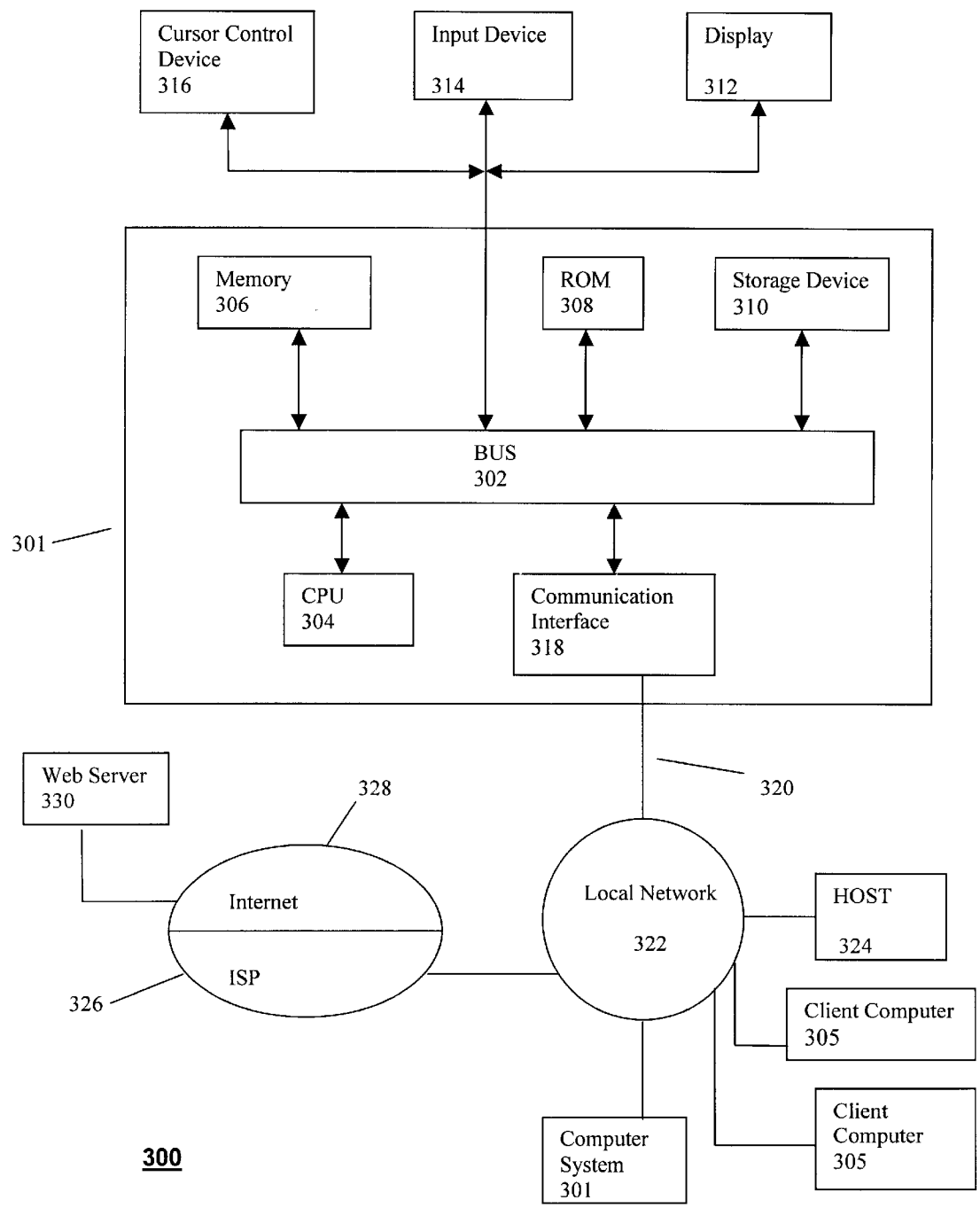

US 6,442,661 B1

SELF-TUNING MEMORY MANAGEMENT FOR COMPUTER SYSTEMS

FIELD OF THE INVENTION

The present invention related to memory management, and in particular, to memory management for computer systems including file servers.

BACKGROUND OF THE INVENTION

Networked computer systems typically include at least one file server data processing system. A file server can comprise a computer including a processor, memory, communication interface, and storage device such as a disk drive, configured by a file system program to provide file server functions. The performance of a file server is dependent upon several factors, one of the most important of which is the amount of physical memory (e.g., RAM) available for buffering/caching disk reads/writes. The limited amount of memory leads to intense competition between the file system and other system needs for memory. Further, the speed of memory block allocation for buffering data upon demand degrades over time primarily due to memory fragmentation. Without an abundance of physical memory, efficient memory management is required to ensure sustained performance without degradation.

However, conventional memory management methods, while enhancing performance in one network environment, often degrade performance in another. Even within one network environment, load changes from hour to hour can very widely and static memory management and tuning methods lead to degradation of the file server performance in many circumstances. Some conventional methods attempt to manage competition for memory by adding more physical memory or by using virtual memory methods, which rely on paging memory to buffer data to and from the storage system (e.g., disk drive). However, adding more physical memory is costly, requires space and consumes power. Further, virtual memory methods invariably lead to slow processing and unacceptable file server performance as they defeat the purpose of file system caching. Other conventional systems attempt to solve memory fragmentation by threading adjacent memory blocks together when freed. However, memory rethreading takes time, leading to reduced file server performance.

There is, therefore, a need for a memory management method and system for network file servers which accelerates memory allocation/deallocation for buffering data, reduces memory fragmentation, increases available memory for the file server file system I/O buffers while optimizing the amount of memory available for other uses, and manages competition for different memory uses, across different network environments and over time within one network environment.

BRIEF SUMMARY OF THE INVENTION

The present invention satisfies these needs. In one embodiment, the present invention provides a method of managing memory including the steps of: in response to requests for allocation of memory blocks that remain allocated for different durations, allocating each memory block from one of a plurality of regions in the memory based on the duration that the memory block is to remain allocated; and maintaining a plurality of memory segments of one or more sizes in the memory, and in response to a request for allocation of a memory block if the requested block size is less than a predetermined size, then allocating the requested block from among said segments, otherwise allocating the requested block from another portion of the memory.

Preferably, in response to requests for allocation of long term memory blocks, long term memory blocks are allocated from a first region of the memory; and in response to requests for allocation of short term memory blocks, short term memory blocks are allocated from a second region of the memory. The number of data segments are changed in relation to memory requests. Further at least a potion of the memory is apportioned for other use such as to a cache having one or more buffers. The cache buffers can be allocated for non-cache use, including increase the number of said data segments, and are then deallocated back to the cache.

In another aspect the present invention provides a memory manager including means for implementing the above steps in a computer system comprising memory and a CPU for managing the memory. Further, the present invention provides a computer program product comprising a computer readable medium including program logic for configuring said computer system to perform the steps of managing memory according to the present invention.

BRIEF DESCRIPTION OF THE DRAWINGS

These and other features, aspects and advantages of the present invention will become understood with reference to the following description, appended claims and accompanying figures where:

FIGS. 6A–B show example memory maps for a heap according to the present invention;

FIGS. 6C–D show example memory maps of the heap of FIG. 6B for long term memory allocation;

FIG. 13 shows a block diagram of an example architecture of an embodiment of another computer system in which the present invention can be implemented.

To facilitate understanding, identical reference numerals have been used, where possible, to designate structurally/functionally identical or similar elements that are common throughout the figures.

DETAILED DESCRIPTION OF THE INVENTION

In one embodiment, the present invention provides a method of managing competition for memory by various processes in computer systems which utilize a cache system for managing at least a portion of the memory. For example, in a computer system without virtual memory which relies upon cache memory (e.g., in order to increase performance for repetitive disk reads), requests by processes in the computer system for allocation of general purpose memory can lead to wasteful competition for limited memory between cache and general purpose needs. In one embodiment, the present invention manages such competition problems in such computer systems, and minimizes memory fragmentation and dynamically tunes memory resources to minimize memory waste, in order to maximize the cache resource. For example, a memory management method and system according to the present invention can be implemented in network systems, network computers, subscriber management systems, network file servers, etc.

Figure 1:
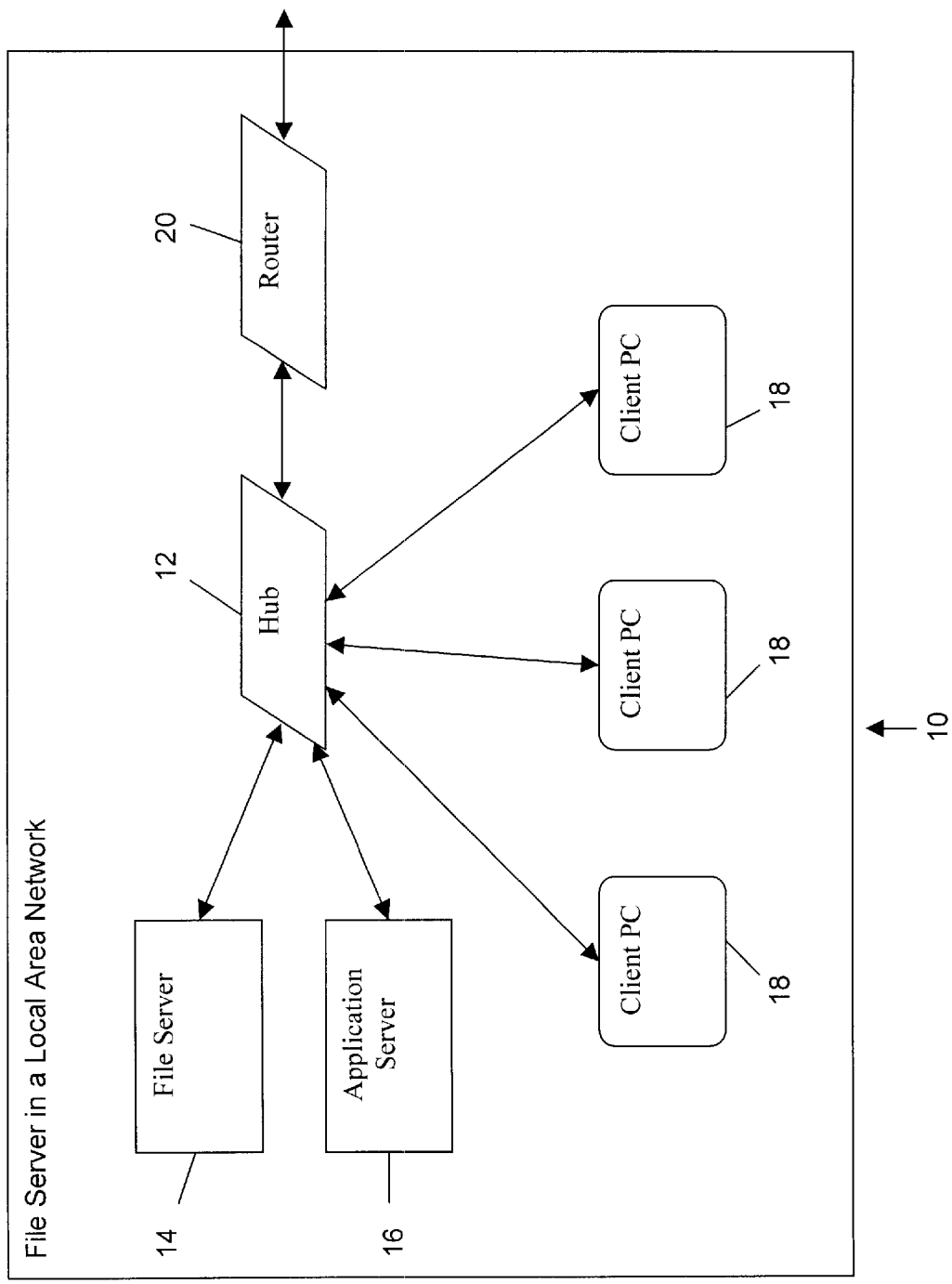
FIG. 1 shows a block diagram of an example architecture of an embodiment of a computer network in which the present invention can be implemented.

In one example version, the present invention can be implemented in a computer network including a network file server and a file system. FIG. 1 shows a block diagram of an example architecture of an embodiment of a computer network 10 (e.g. local area network) in which the present invention can be implemented. The network 10 comprises a hub 12 to which a file server 14, an application server 16 and client computers 18 (e.g., personal computers) are interconnected for communication therebetween and with other computer/network systems via a router 20. The file server provides functions, including data storage and retrieval, for at least the network.

Figure 2A:
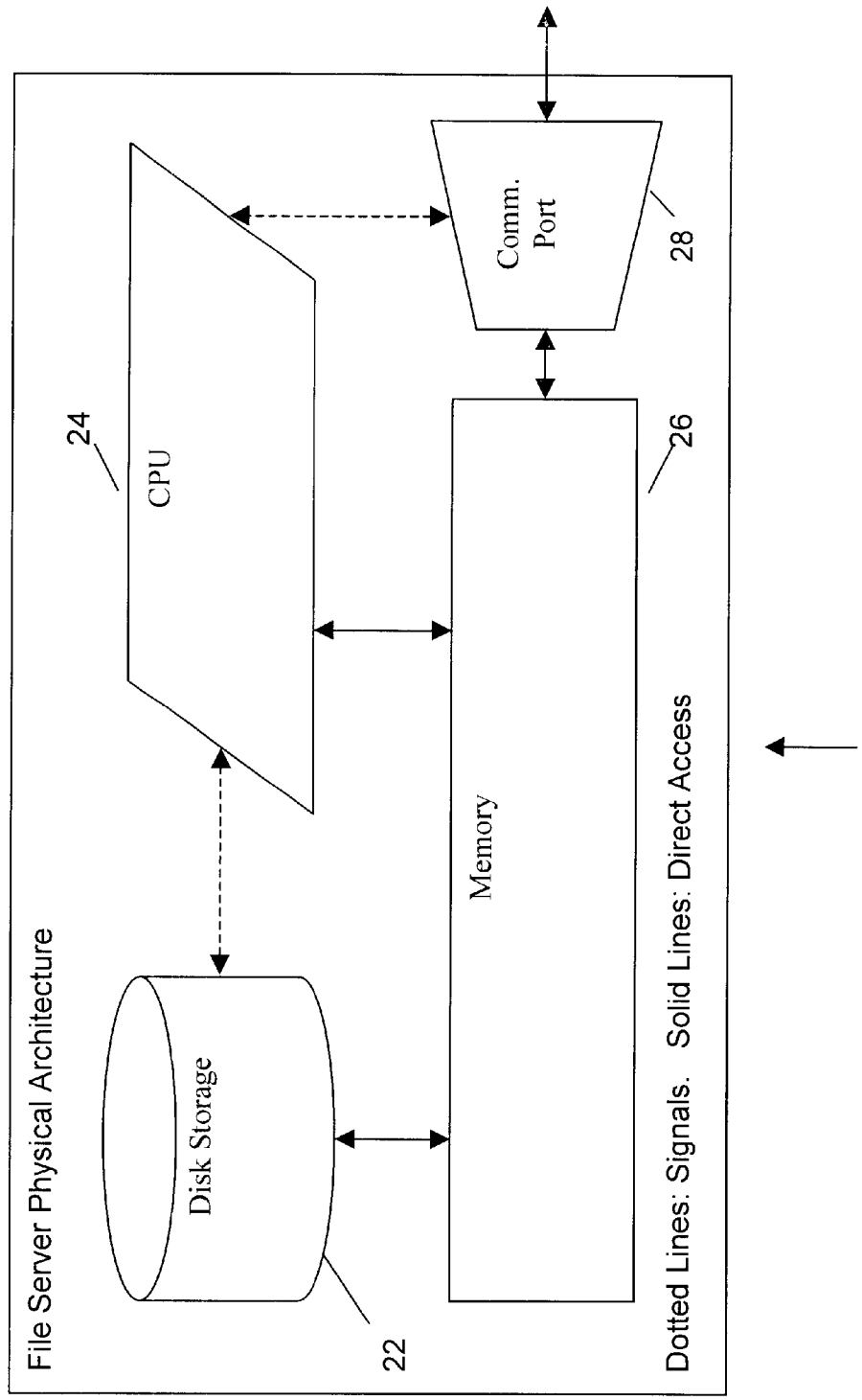
FIG. 2A shows a block diagram of an example system architecture of an embodiment of the file server of FIG. 1.
Figure 2B:
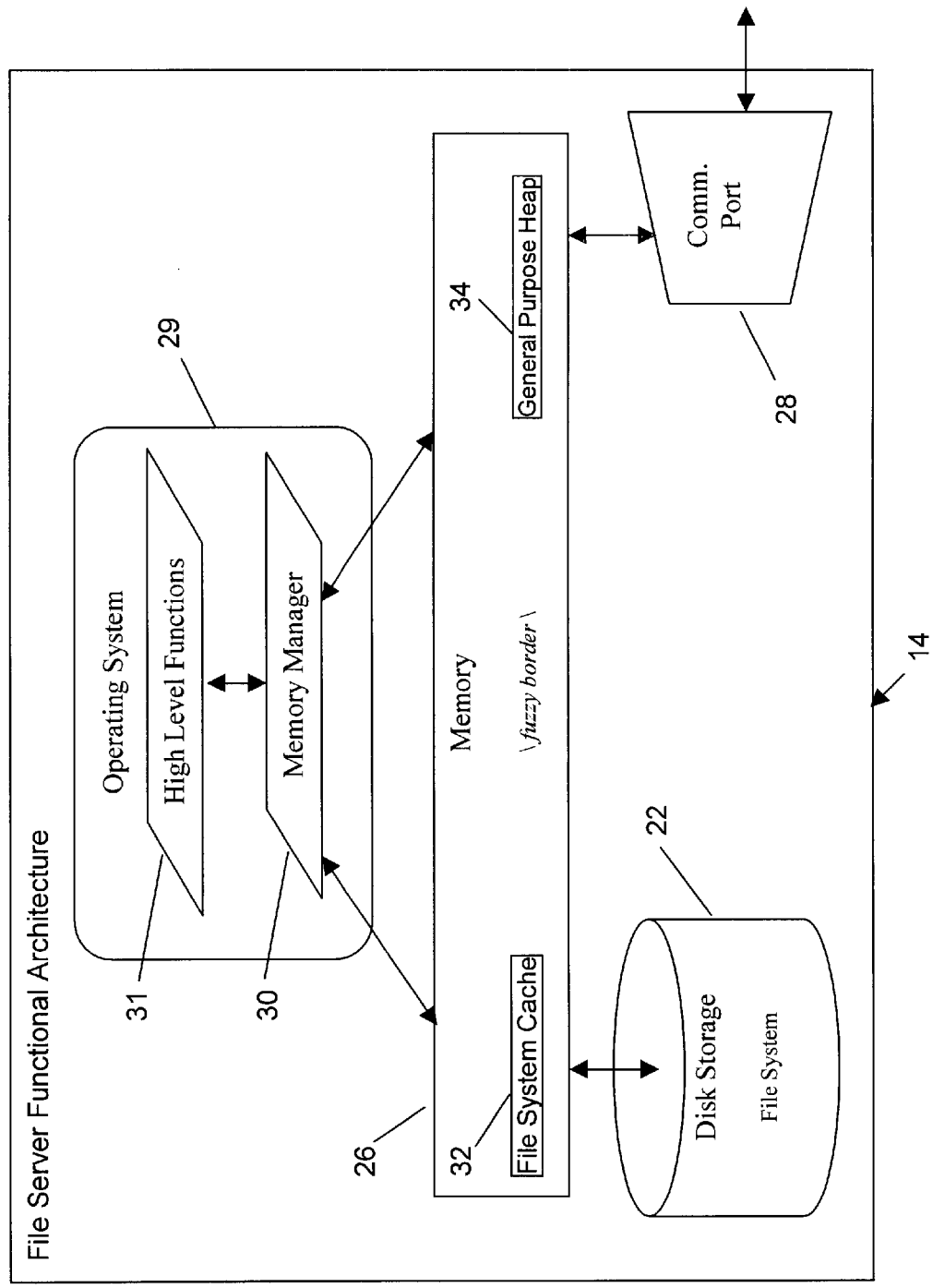
FIG. 2B shows a block diagram of an example functional architecture of the file server of FIG. 2A.

FIG. 2A shows a block diagram of an example system architecture of an embodiment of the file server 14 of FIG. 1. The filer server 14 comprises a storage device 22 such as a disk drive, CPU 24, memory 26 and a communication interface 28 (e.g., Ethernet Port) connected to the hub 12. FIG. 2B shows a block diagram of an example functional architecture of the file server 14 of FIG. 2A, wherein the file server 14 is configured to provide functions including memory management and file system management. In one embodiment, memory management methods according to the present invention are implemented as a memory manager module (e.g., software) 30 in an operating system (OS) 29 for execution by the CPU 24 to configure the file server 14 to manage the memory 26. The operating system 29 can further include high level functions including functions for implementing a network file server including e.g. protocol handling, user interface functions, etc. In general, the memory 26 includes a cache 32 for use by e.g. a file system software, and a general purpose heap 34 for other memory requirements/allocations.

In one embodiment, a memory management method according to the present invention, implemented as the memory manager 30, provides rapid memory allocation and de-allocation, reduced memory fragmentation, maximizes the amount of memory available for a cache (e.g., file system I/O buffers) while optimizing the amount of memory available for other uses, and manages competition for different memory uses by system self-adaptation to different usage levels across different network environments and over time within one network environment, including self-tuning to optimize performance to a variety of environments and dynamic conditions.

Figure 3A:
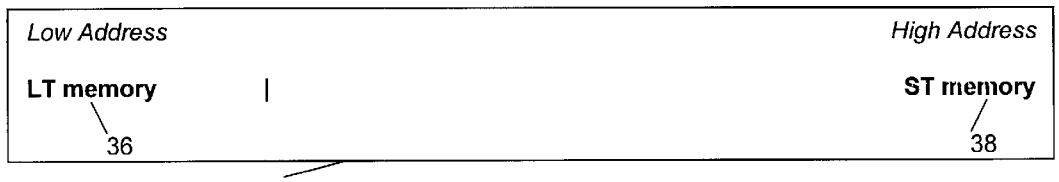
FIGS. 3A–3E show example memory maps according to an embodiment of the memory management of the present invention.

Referring to FIG. 3A, in one version, to effectively eliminate fragmentation of the memory 26, at file server startup/initialization the memory manager 30 segregates memory block allocations that are to remain allocated for long periods of time, long term (LT) memory blocks, to a first region LT memory 36 of the memory 26 from the heap 34 (preferably the low address end of the memory 26).

Figure 3B:
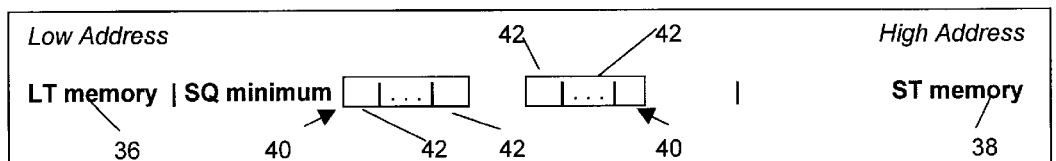

Further, the memory manager 30 segregates memory block allocations that are to remain allocated for short periods of time, short term/transient (ST) memory blocks, to a second region ST memory 38 of the memory 26 from the heap 34 (preferably the high address end of the memory 26). Referring to FIG. 3B, the memory manager 30 then creates and maintains size queues 40 (SQ) including plurality of memory segments 42 of varying predetermined sizes, or separate memory pools, in a third region of the memory from the heap 34, to satisfy smaller short term efficient memory block allocation requests (e.g., requiring few/brief allocation steps). As such, smaller short term memory block allocations are segregated by the use of the size queues 40 (e.g., six queues), dedicated to predetermined sizes of memory allocation requests (e.g., memory block allocations ranging from 32 up to 1024 bytes, with odd sizes rounded up).

In addition to the size queues 40, the ST memory 38 can also be used to satisfy short-term memory block allocations, however, preferably size queues 40 are utilized for smaller short term memory block allocations (e.g., 1024 bytes or less) while the ST memory 38 is utilized for larger short term memory block allocations. In one example, after long term memory block allocations are processed (e.g., after initialization), thereafter the memory manager 30 treats all LT memory allocation requests as ST requests. Size queues 40 are used for small sized requests. This avoids fragmentation by handling memory allocation requests according to size and by duration. LT memory allocation requests can be handled differently from ST memory allocation requests after initialization, if a large memory allocation request is preferentially allocated from ST memory or by cache.

Figure 3C:
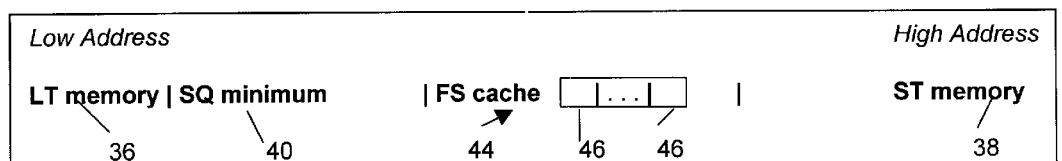

As such a memory management method according to the present invention effectively eliminates fragmentation of the memory 26 in a computer system including memory generally partitioned/apportioned for at least cache use and general purpose (e.g., such as in the networked file server appliance 14). The method of the present invention alleviates fragmentation of the memory by preventing mixing of small and large memory block allocations, and by preventing mixing short and long term memory block allocations, in the memory 26. There is no need for processing time to thread memory together from smaller adjacent buffers to larger ones in the size queues 40, nor is it necessary to keep track of the positions of buffers in the size queues 40. Referring to FIG. 3C, the memory manager 30 provides control of almost all idle memory to the file system for use as the file system cache 44 (FS cache) including buffers 46.

The requested memory block allocations are segregated by duration (e.g., long term, short term, etc.) and by use of size queues 40. Further, the separate memory pools/size queues 40 are not threaded together, wherein memory allocations take memory segments 42 from the size queues 40 and memory deallocations return memory segments 42 to the size queues 40, without further processing. The size queues 40 allow reduction of processing overhead for buffer/segment 42 threading and eliminate ordering by position. The size queues 40 can be utilized as pools of memory for allocation similar to a heap.

In another embodiment, according to the memory management method, the memory manager 30 dynamically tunes the size queues 40 (e.g., by dynamically changing the number of data segments 42 therein) to afford adaptation to varying memory requirements in the file server. The method allows managing competition for memory between the file system cache buffers 46, and other memory requirements of the file server 14. After system initialization/start-up, under control of the memory manager 30, memory block allocations in response to memory requests are limited to no more than is needed for a single file system cache buffer 46 (e.g., 8192 bytes). Further, all memory remaining in the heap 34 after initial long term memory block allocations 36, size queue 40 creation and optionally the ST memory 38, is provided to the file system for use in the cache 44 to maximize the number of buffers 46 therein.

The memory manager 30 manages competition for memory by providing most of the available memory to the cache 44 and then borrowing one or more of the cache buffers 46 when needed for: memory block allocations of a certain size, for use as the size queues 40, for use as the ST memory 38, etc. Thereafter, the memory manager returns (deallocates) said borrowed buffers 44 back to the cache 40 when released by the operating system.

As such, in one version the memory manager 30 dynamically changes the dividing line (e.g., fuzzy dividing line) in memory between the cache 40 and the heap 34 comprising the SQ memory 40 and the ST memory 38, in relation to memory allocation requests. In one example, under the control of the memory manager 30, memory block allocations of a predetermined size (e.g., 8192 bytes) are borrowed directly from the cache 44 (e.g., from cache buffers 46 of 8192 bytes in size) and returned directly to the file system cache 46, without requiring memory threading or further processing. The memory manager 30 borrows memory from the cache 44 when for example: (a) the ST memory 38 is exhausted, wherein the memory manager 30 borrows a buffer 46 to satisfy allocation requests above a predetermined size (e.g., 1024 bytes), (b) no ST memory 38 is reserved, wherein the memory manager 30 borrows one or more buffer 46 from the cache 40 to satisfy one or more allocation requests, or (c) the memory manager distinguishes between allocation requests and determines that borrowing one or more cache buffers 46 is more efficient where e.g. an allocation request is for long term memory, and even though the system is fully initialized, the memory manager allocates long-term memory requests from the cache 44 (e.g., the file system requests memory and the memory manager 30 allocates the memory from the cache 44), Etc.

Figure 3D:
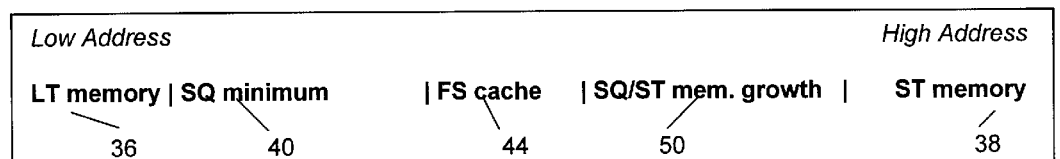

Referring to FIG. 3D, further, the memory manager 30 increases the number of segments 42 in the size queues 40 when depleted by borrowing one or more file system cache buffers 46 to create additional data segments 42, included in SQ growth 50, for one or more size queues 40. Each size queue 40 can grow independently, borrowing one or more file system cache buffers 46, thereby allowing the file server 14 to self-tune to the sizes of allocations required by different networking environments.

The file system cache 44 is for the use of the file system, while the ST memory 38 and the size queues 40 in the heap 34 serve the system as a whole for general memory needs such as the file server's operating system needs for allocating memory for storing information including e.g. network protocol specific code to store information about a user connection, or administrator utility for sorting a list of currently open files or system database needs for block writes to flash memory, or many other uses. Both the ST memory 38 and the size queues 40 can borrow memory from the file system cache 46 (e.g., FIG. 3D) and return the borrowed memory (e.g., FIG. 3E), to manage competition for memory, wherein dynamic borrowing/returning memory provides self tuning.

The size queues 40 can be passively trimmed to allow return of borrowed buffers 46 to the file system cache 44 when no longer required by system needs. For example, a background trimming process determines if all segments 42 within a single borrowed file system cache buffer 46 in the SQ growth 50 are free, so that buffer 46 can be returned to the file system cache 44. As such, dynamic tuning by using the file system cache buffers 46 to temporarily increase size queues 40 (and/or heap space), allows managing competition for memory.

Figure 3E:
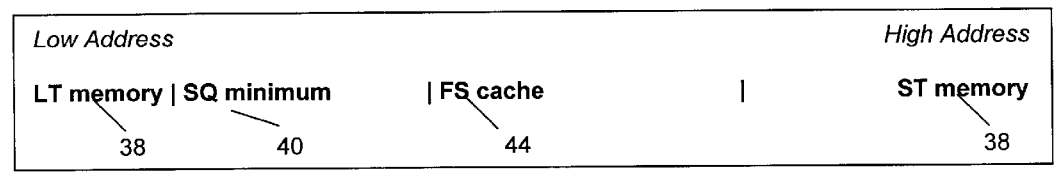

In the example operation shown FIGS. 3A–E, mapping of the memory space by the memory manager 30 includes five states, wherein: (1) as shown in FIG. 3A, the memory space in heap 34 is divided to LT memory 38 for long term (LT) allocations from low address memory, and to ST memory 38 for short term (ST) allocations from high address memory, (2) as shown in FIG. 3B, size queues (SQ) 40 are then created as pools of memory including a minimum number of memory segments 42 allocated from e.g. the low address memory region, wherein allocations from size queues 40 are for short term memory blocks; (3) as shown in FIG. 3C, when system initialization is complete, most unallocated memory is provided to the file system (FS) for use as cache 44; (4) as shown in FIG. 3D, thereafter, if size queues 40 need to grow as described above, the needed memory 50 is borrowed from the file system cache 44; and (5) as shown in FIG. 3E, when size queues 40 are trimmed back to minimum by returning the borrowed memory 50 to the file system cache 44, the memory layout returns to the post-initialization state in FIG. 3C. By performing self-tuning (e.g., FIGS. 3D–E), the memory manager 30 adapts itself to a wide variety of network environments, which a networked file server appliance can expect to encounter.

As such, during startup, all memory (not previously dedicated) is in the form of the heap 34, comprising the LT memory 36, the ST memory 38, and the SQ memory 40. After startup, the LT memory 36 is no longer available for general use as it has been allocated for long term allocations. After startup, the memory manager 30 converts as much remaining memory in the heap 34 as possible to the cache 44. Therefore, what remains in the heap 34 for general purpose allocation are the minimum reserved SQ memory 40 and a small reserved portion of the heap 34 for the ST memory 38. The cache 44 is not a heap and so not for general use allocations, rather the cache 44 is for specialized use such as for the file system I/O buffers. When needed, cache buffers 46 are borrowed to temporarily provide heap memory for general allocation, and then returned to the cache 44. The ST memory 38 is structured as a heap (small heap) comprising ordered link list of memory blocks which are unthreaded and threaded when allocated and deallocated, respectively, (described further below). Optionally, the memory manager 30 can convert all ST memory 38 to the cache 44, and then fulfill all allocation requests above the size queue segment limit (e.g., 1024 bytes) using borrowed FS cache buffers 46.

The method of preventing memory fragmentation can be used alone or with the methods for managing competition and for self-tuning. Further, size queue dynamic tuning can be utilized without the method for managing memory competition. In that case, instead of borrowing buffers 46 from file system cache 44 to grow the size queues 40, the memory manager 30 can borrow the additional needed memory from a general heap such as the ST memory 38. Further, the competition for memory between the file system cache 44 and the ST memory 38, can be managed as described without preventing fragmentation or performing self-tuning.

The methods for preventing fragmentation (e.g., segregating allocations by duration and the use of size queues 40

) can be accomplished without method for managing competition for memory (e.g., between cache 44 and general purpose size queues 40 and heap 38) or dynamic tuning (e.g., growing the size queues 40 on demand and trimming them passively). However, without utilizing the method for managing competition for memory, sufficiently large amounts of memory must be initially reserved for the size queues 40 to avoid competition with the FS cache 44, wherein either more memory is required or else less memory can be dedicated to the FS cache 44. The methods for preventing fragmentation can also be implemented without the methods for dynamic tuning, wherein the size queues 40 and the ST memory 38 include sufficient memory to satisfy the maximum memory use the system can anticipate. This requires upper limits on the size queues 40 and the ST memory 38.

Further, the methods for dynamic tuning can be implemented without the methods for managing competition between the FS cache 44 and general use allocations from the size queues 40 and the ST memory 38. Dynamic tuning is an aspect of managing competition, but can be implemented merely to manage the competition for memory between the different size queues 40 and the ST memory 38. While it would be entirely possible and appropriate to implement dynamic tuning without concern for the needs of an FS cache 44, it is preferable to implement methods for dynamic tuning and preventing fragmentation together.

Implementing the methods to manage memory competition between the FS cache 44 and general allocation needs (e.g., by providing all available memory to the FS cache 44 then borrowing back buffers 46) can be implemented without using dynamic tuning. As such, a borrowed FS cache buffer 46 can be utilized for general ST memory 38, rather than for specific size queue growth. Additionally, it is not required to return borrowed buffers 46 back to the FS cache 44 (i.e., tuning one way—borrowing but not returning FS cache buffers 46). However, one way tuning can lead to inefficient memory use over time, while excluding size queues from self-tuning can lead to size queue exhaustion and allocation failure, or fragmentation. As with dynamic tuning, it is preferable to manage competition between the FS cache 44 and general purpose needs (e.g., the size queues 40 and/or the ST memory 38), while alleviating fragmentation. Therefore, the methods of managing competition and dynamic tuning collaborate to prevent memory waste, and are not dependent upon minimizing fragmentation. Over time, fragmentation consumes memory and processing time, unless the operating system is restarted regularly after only short duration of running to reinitialize the memory. A combination of the methods for managing competition, dynamic tuning and minimizing fragmentation can provide most efficient memory management.

Figure 4:
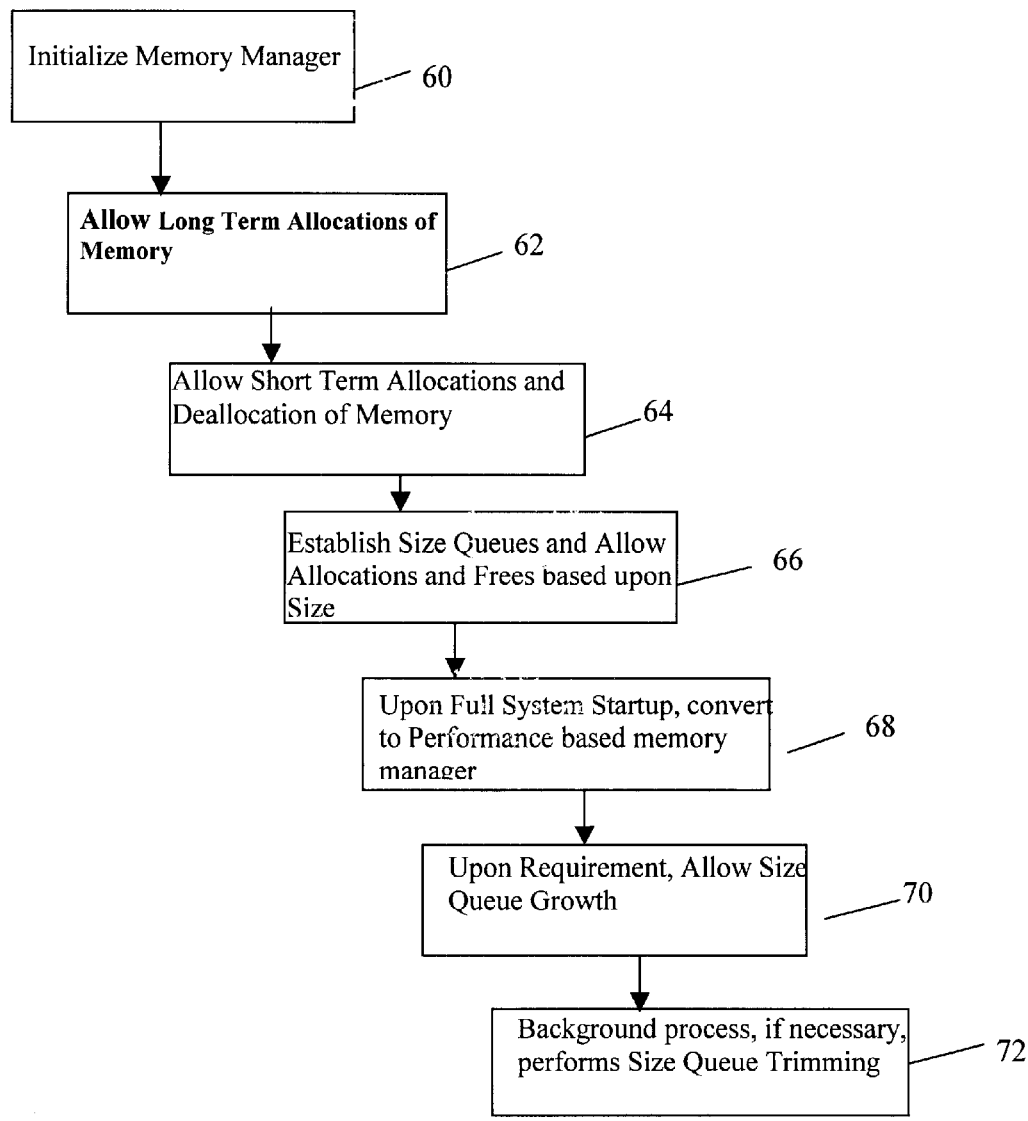
FIGS. 4–5 show example flow diagrams of embodiments of the memory management method of the present invention.

FIG. 4 shows an example top level flow diagram of an embodiment of the memory management method of the present invention implemented in one version as the memory manager 30, including the steps of: initializing the memory manager 30 (step 60), allocating long term memory buffers from low address end of memory (step 62), allocating/deallocating temporary/short term memory buffers from high address end of the memory 26 (step 64), generating size queues 40 and allocating/deallocating memory blocks from segments 42 therein (step 66), after system initialization/startup, managing memory to increase performance (step 68), increasing/decreasing size queues 40 in relation to memory requests (tuning) (step 70), and performing trimming of size queues 40 (step 72). One or more of the above steps can be repeated. Example embodiments of the above steps are described further below.

Figure 5:
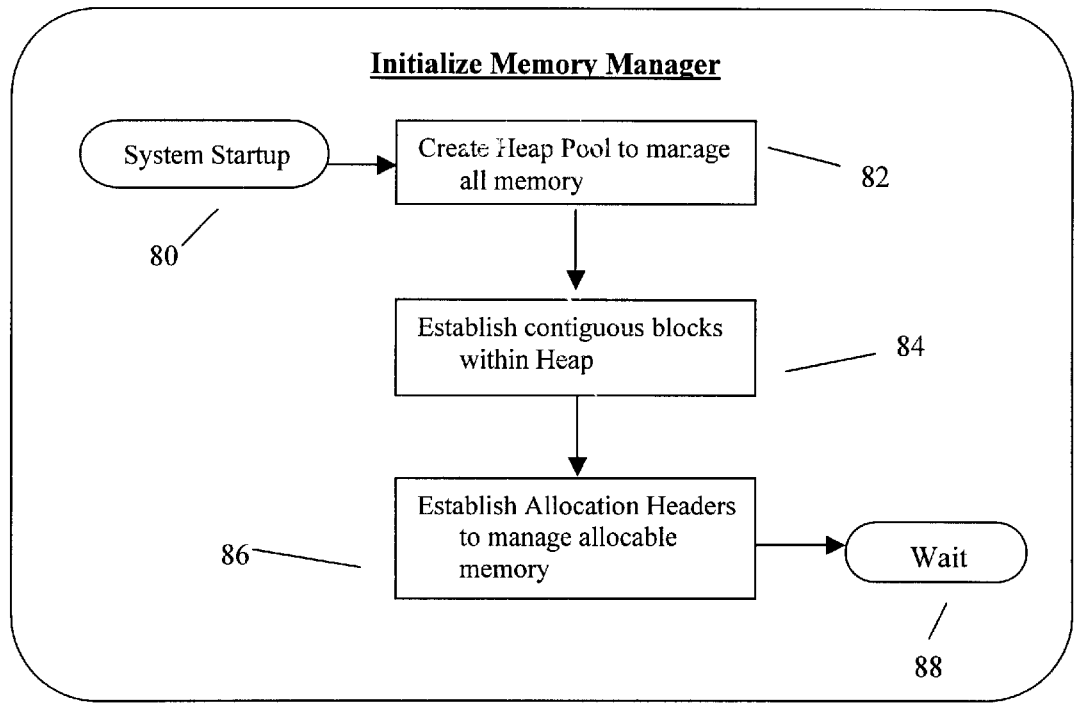

FIG. 5 shows an example flow diagram of an embodiment of step 60 in FIG. 4, for initializing the memory manager 30. During initial system startup (step 80), the memory manager 30 is initialized by steps including: establishing a heap 34 in the memory 26 by creating a heap pool header 90, shown in FIG. 6A, to manage all memory available for general-purpose allocation (step 82), and establishing a block header 92 at the start of each contiguous block of memory 94 available for allocation, initializing the entirety of each block 94 with a known value (e.g., 'M'), and establishing a link list 96 connected to the heap pool header 90 to chain together all of the blocks 94 (step 84), leading to a system memory map as shown by example in FIG. 6A.

Referring to FIG. 6B, each block 94 can be divided into one or more buffers/blocks 95 for general purpose allocation, wherein an allocation header 98 is established at the beginning of each block 95 to manage each block 95 for general-purpose use/allocation. The allocation headers 98 for allocated blocks 95 are marked as 'allocated', and the allocation headers for the remaining allocable blocks 95 are marked as 'free' and chained together in a two-way free memory link list 100 maintained in memory address order and connected to the heap pool header 90 (step 86), leading to a system memory map as shown by example in FIG. 6B. The memory manager 30 then awaits requests from the system operating system (OS) (step 88).

Figure 7:
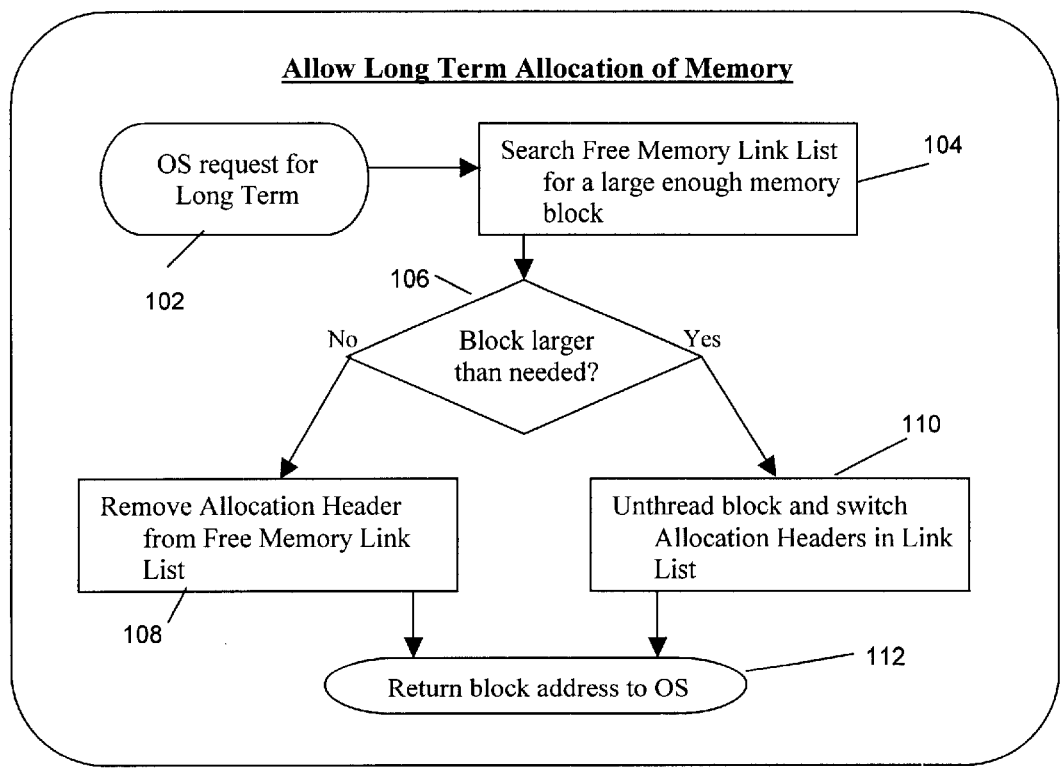
FIGS. 7–12 show example flow diagrams of embodiments of the memory management method of the present invention.
Figure 6D:
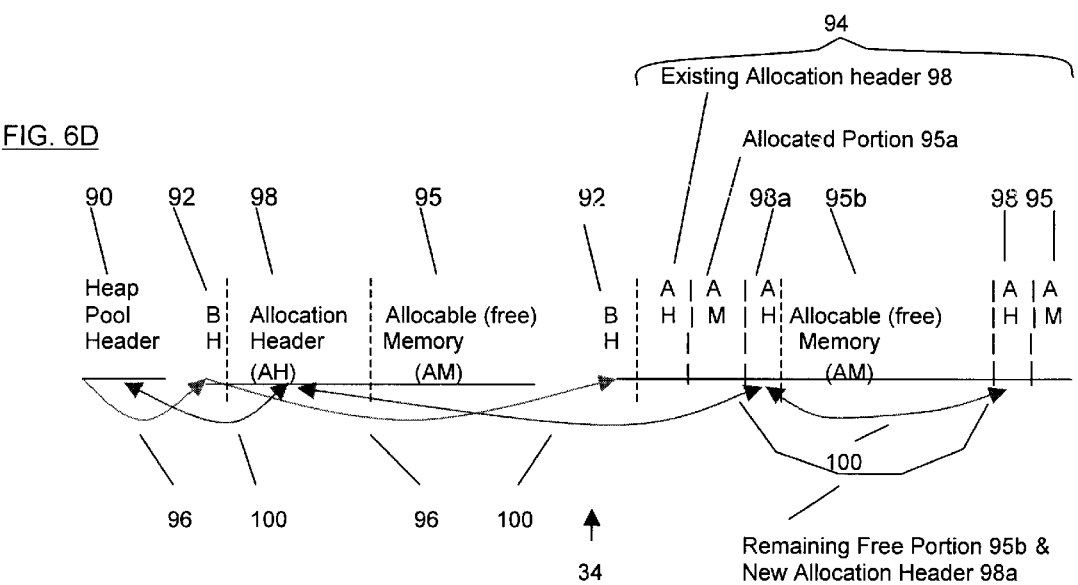

FIG. 7 shows an example flow diagram of an embodiment of step 62 in FIG. 4, for allocation of long term memory from the heap 34 during startup as shown in FIG. 6B. Upon receiving a request from the operating system for long term allocation of a memory block (step 102), the memory manager 30 performs steps including: traversing through all available (free) allocation headers 98 in the heap 34, starting at low memory address (LT memory 36), to find the first memory block 95 large enough for the size of requested memory block (step 104); determining if the found allocable memory block 95 is significantly larger than the requested size (step 106); if not, as shown by example in FIG. 6C, removing the allocation header 98 of the found block 95 from the link list 100 and re-linking the link list 100 (step 108); otherwise, as shown by example in FIG. 6D, unthreading a portion 95a of the found block 95, the portion 95a being of the size requested, by adjusting the size in the found/existing allocation header 98 of the found block 95 (e.g., subtracting the requested size from the size of the allocation header 98) and creating a new allocation header 98a in memory beyond the portion 95a of the block 95 for the remaining free portion 95b of the found block 95, and replacing the allocation header 98 in the allocation header/free link list 100 with the new allocation header 98a by placing the new allocation header 98a in the link list 100 (step 110); and marking the existing allocation header 98 for said memory portion 95a as 'allocated' (not free) and returning the memory address immediately following the existing allocation header 98 to the operating system requestor (step 112).

Threading includes the steps of joining two adjacent buffers (e.g., blocks 95) of memory into a single buffer governed by only one allocation header 98. Threading can be performed when a freed buffer is adjacent to another free buffer, to join into a larger buffer, thereby reducing fragmentation. Unthreading includes the steps of dividing a single buffer (e.g. block 95) with a single allocation header 98 into e.g. two smaller buffers with two corresponding allocation headers 98 (e.g., when part of an available buffer is allocated, and the remaining part is left behind as free).

Figure 6E:
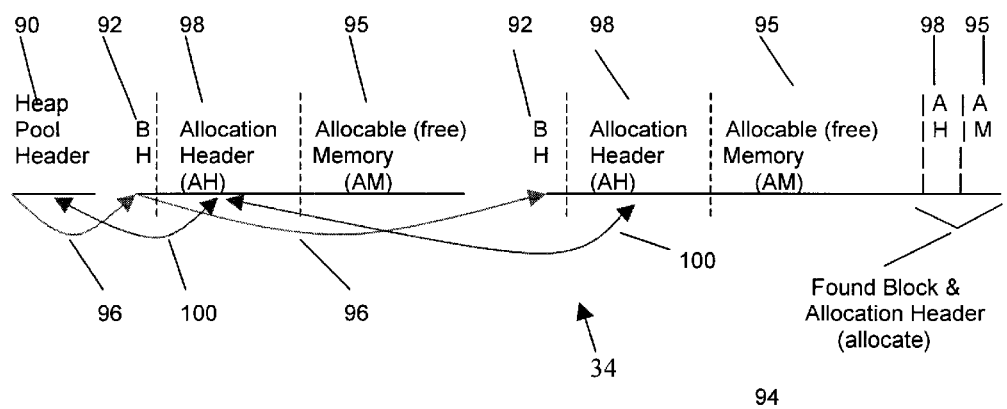
FIGS. 6E–F show example memory maps of the heap of FIG. 6B for short term memory allocation.
Figure 6F:
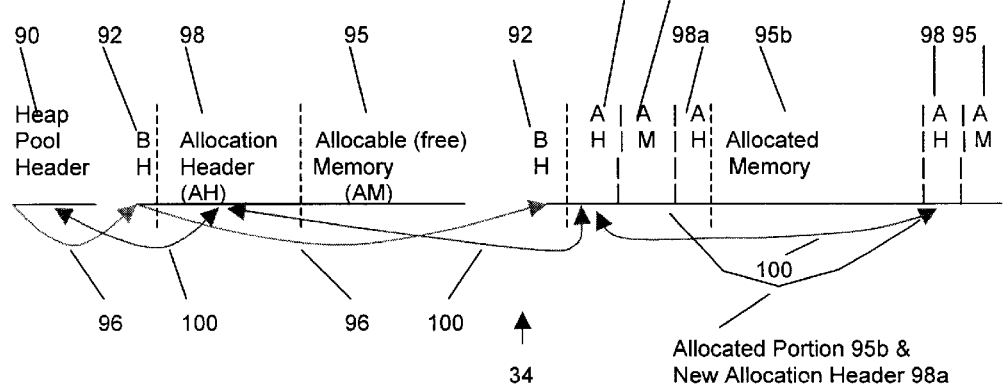
Figure 8:
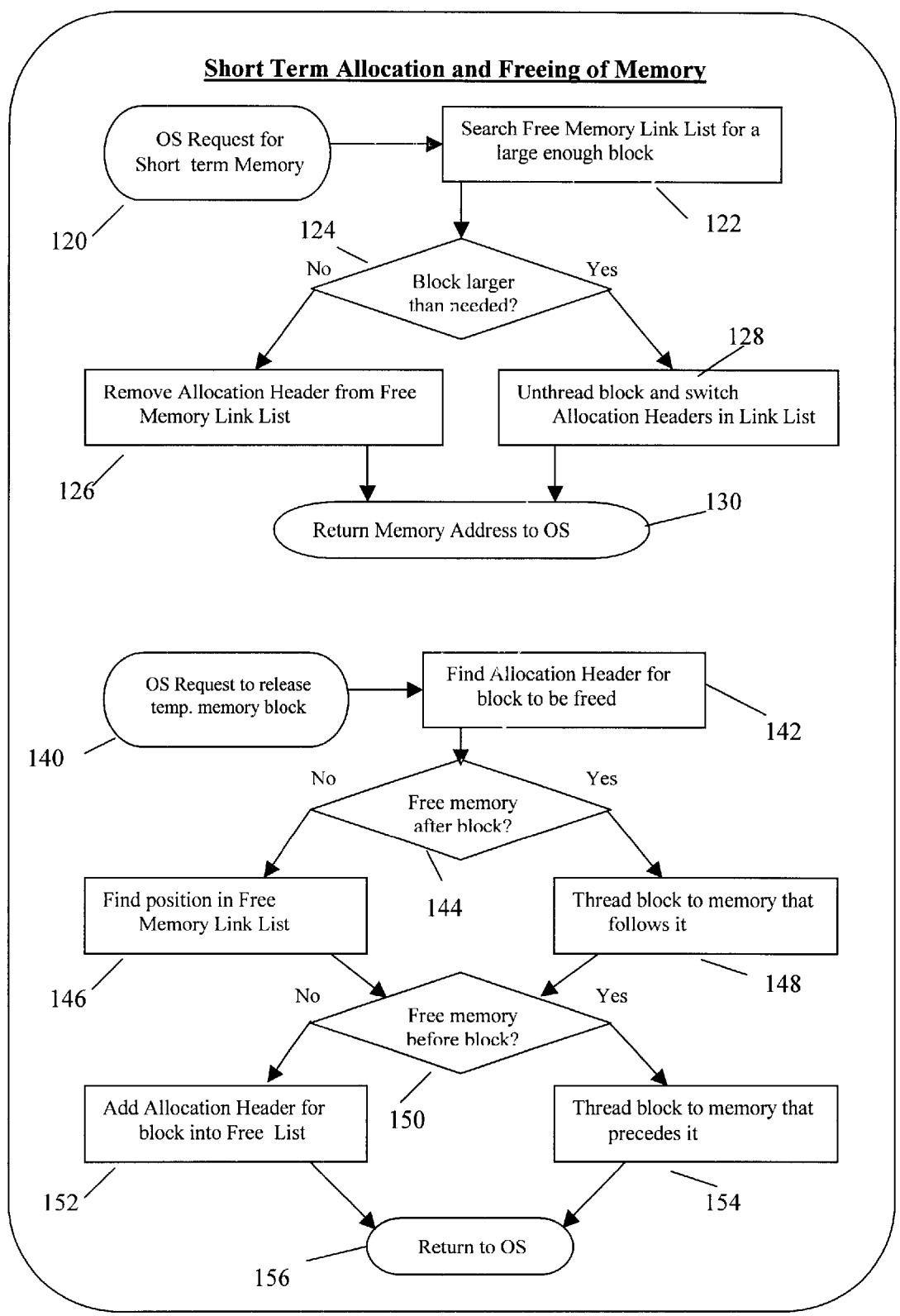

FIG. 8 shows an example flow diagram of an embodiment of step 64 in FIG. 4, for temporary/short term allocation/ deallocation of memory blocks from the heap 34 of FIG. 6B. Upon receiving request from the operating system for short term allocation of a memory block (step 120), the memory manager 30 performs steps including: traversing through all available (free) allocation headers 98 in the heap 34, starting at high memory address (ST memory 38), to find the first memory block 95 that is large enough for the size of memory requested (step 122); determining if the allocable memory block 95 is significantly larger than requested size (step 124); if not, as shown by example in FIG. 6E, removing the found allocation header 98 from the free link list 100 (step 126), and returning the memory address immediately following the found allocation header 98 to the operating system requestor (step 130); otherwise, as shown by example in FIG. 6F, unthreading the requested memory by modifying the size in the found/existing allocation header 98 (e.g., subtracting the requested size from the size in the found allocation header 98); dividing the block 95 to a portion 95a to remain free and a portion 95b of the requested size to be allocated; creating a new allocation header 98a beyond a portion 95a of the found block 95 in memory to manage the portion 95b to be allocated (unlike allocation from the low address of memory for long term allocations, the allocation header link list 100 is not altered here) (step 128); marking the new allocation header 98a for said memory portion 95b being allocated as 'allocated' (not free) and returning the memory address immediately following the new allocation header 98a to the operating system requestor (step 130).

Upon release by the operating system of short term allocated memory (step 140), the memory manager 30 performs steps including: finding the allocation header 98 in the heap 34 (FIGS. 6B,E–F) for a memory block 95 being freed, located immediately before the memory address provided for the released block 95, and marking the found allocation header 98 as 'free' (step 142); then attempting to perform threading by determining if there is a valid free allocation header 98 immediately following the block 95 being freed (step 144); if not, traversing through the link list 100 in heap 34 from highest memory address to lowest memory address to find the position in the free link list 100, in memory address order, where the allocation header 98 of the block 95 being freed should be inserted (step 146); otherwise, if a valid allocation header 98 exists immediately following the block 95 being freed, and the memory block corresponding to said following allocation header is also free, then threading the block 95 being freed to the immediately following memory, by adding the size in said following allocation header 98 to the size in the allocation header being freed, and removing said following allocation header from the free link list 100, marking it as no longer valid (step 148).

The memory manager 30, then performs steps including: determining if the allocation header 98 for the memory immediately preceding the allocation header 98 of the block 95 being freed in the free memory link list 100 is contiguous with the block 95 being freed (step 150); if not, adding the allocation header 98 for the block being freed into the link list 100 (step 152); otherwise if the allocation header 98 immediately preceding the allocation header of the memory being freed in the link list 100 is contiguous with the block being freed, threading the preceding memory to the block being freed, by altering the size in said preceding allocation header 98, and marking the allocation header for the block being freed as no longer valid, wherein the free memory link list 100 is not altered (step 154); and returning to the operating system (step 156).

Figure 6G:
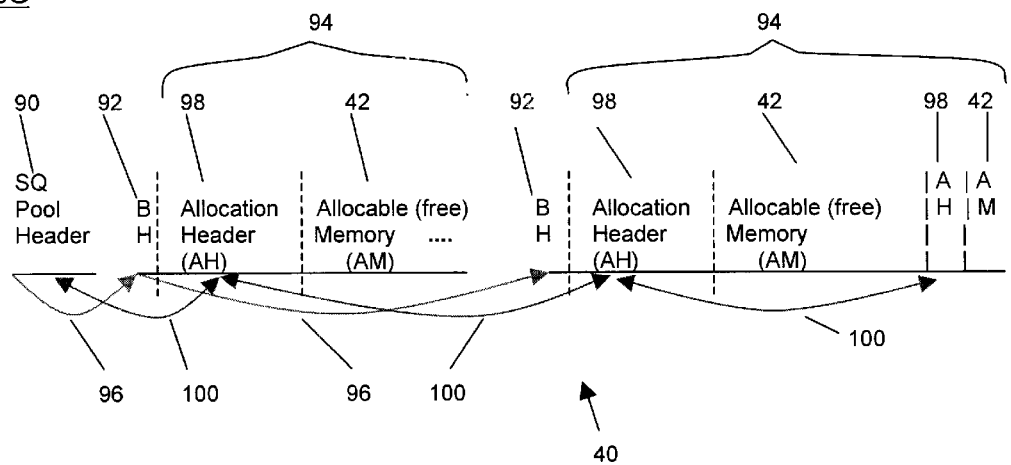
FIGS. 6G–H show example memory maps of the size queue heap allocation and growth.
Figure 6H:
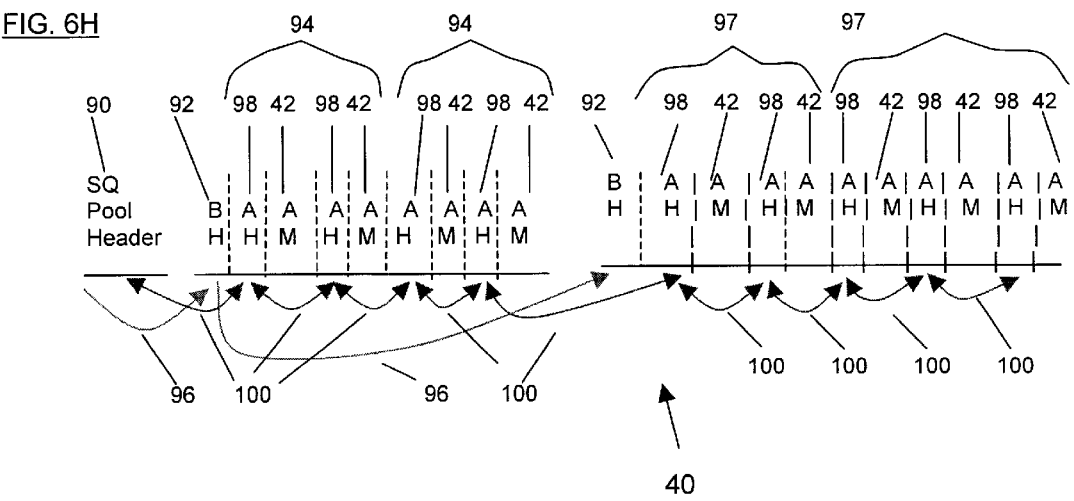
Figure 9:
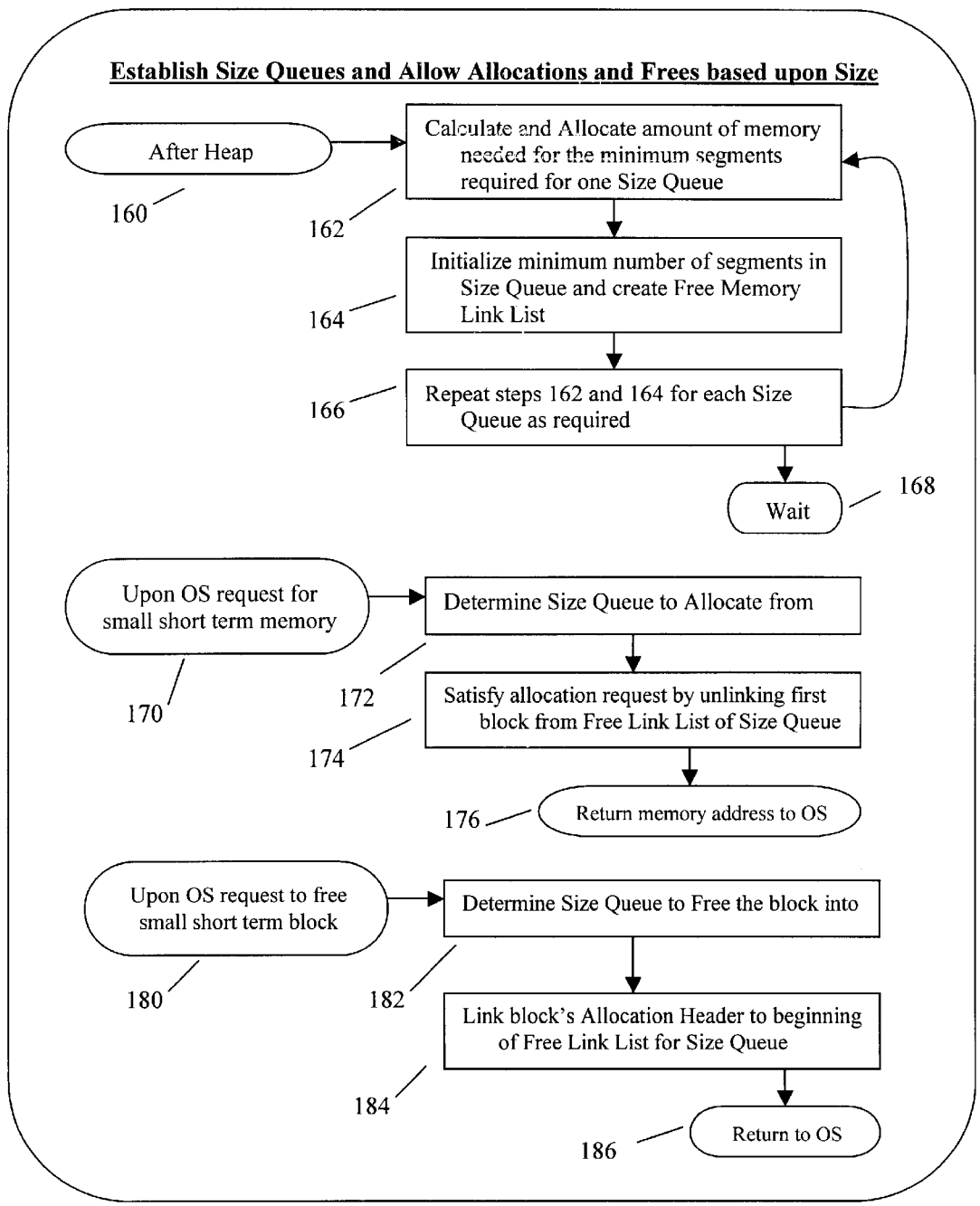

FIG. 9 shows an example flow diagram of an embodiment of step 66 in FIG. 4, for establishing and creating size queues 40 for memory allocations/deallocations based upon size. After long term allocations from the heap 34 (step 160), but before the file server's operating system is fully initialized, the memory manager 30 establishes size queues 40 for short term allocations of small blocks of memory, by steps including: for a memory 26 of certain size, estimating the minimum number of segments 42 required to create an efficient size queue 40 (e.g., 100 segments of memory 32 bytes long each); calculating the amount of memory necessary to create the size queue 40 as a heap/memory pool (e.g., 100 segments times 32 bytes plus the size of 100 allocation headers 98 plus one block header 92); allocating the memory from the heap pool 34; and establishing each size queue 40 (e.g., FIGS. 6G–H) similar in structure to the heap 34 described above (FIGS. 6A–B), by creating the segments 42 in memory (preferably contiguously allocated), separated by allocation headers 98 for managing each segment 42 (step 162); creating a free memory link list 100 for the size queue 40 chaining all of the allocation headers 98 together, much the same way as shown in FIGS. 6A–B and described above (step 164); repeating steps 162 and 164 for each size queue 40 (e.g., multiple size queues of data segments of 32 bytes, 64 bytes, 128 bytes, 256 bytes, 512 bytes, 1024 bytes etc.) (step 166); and waiting for requests from the OS (step 168).

Upon receiving operating system requests for short memory allocations at or below the size of the largest segments 42 (e.g., 1024 bytes) in a size queue 40 (step 170), the memory manager 30 performs steps including: determining which size queue 40 to utilize to satisfy the request (step 172). For example, a jump table of e.g. 32 slots can be utilized, wherein by taking the requested size minus one and dividing the result by 32, an appropriate size queue 40 with segments 42 sufficiently large to satisfy the request, is selected directly.

The memory manager 30 selects a size queue 40 in response to allocation requests, by e.g. subtracting 1 from the requested memory size, dividing the result by 32 and truncating the answer to an integer, to quickly generate a number between 0 and 31. (e.g., for request of 32 bytes, trunc((32−1)/32)=0; for a request 33 bytes, trunc((33−1)/32)=1, for a request of 1024 bytes, trunc((1024−1)/32)=31; etc). A 32 member array (e.g., jump table) is maintained, providing 32 slots, wherein the calculated values are between 0 and 31 (array slot number). If the calculated value is 1 or 2 then jump to a size queue with 64-byte segments 42; if the calculated value is 3, 4, 5 or 6 then jump to size queue with 128-byte segments 42, Etc. As such each member points to the proper size queue (i.e. 2, 64, 64, 128, 128, 128, 128, 256, . . . ). Therefore, with minimum processing, the memory manager 30 quickly resolves a size queue 40 to allocate memory from. When segment allocations are freed back to the size queue, the size queue pointer in the allocation header for a given segment 42 is utilized to find the appropriate size queue. However, instead of the pointer, other methods such as the using a lookup array similar to that used for allocation, can be utilized.

The memory allocation request is satisfied by obtaining a segment 42 from the beginning of the free link list 100 in a size queue 40 (step 174). Because all segments 42 in the selected size queue 40 are the same size, no searching for a segment 42 of size large enough is necessary, and no 'unthreading' is required. The memory manager 30 then return the memory address of the allocated segment 42 to the OS (step 176).

Upon release of short term allocated memory at or below the size of the largest segments 42 (e.g., 1024 bytes) in a size queue 40 (step 180), the memory manager 30 determines which size queue 40 the memory block should be released to by using the memory address of the size queue 40 embedded within the allocation header 98 of the segment 42 (step 182). The memory manager 30 then frees/deallocates the released segment 42 by marking the Allocation Header 98 of the segment 42 as 'free' and adding the allocation header 98 to the beginning of the free memory link list 100 of the size queue 40 (step 184). The memory manager 30 then return status to the OS (step 186). Because all segments 42 in the size queue 40 are the same size, no threading is required, and because no threading is necessary, minimal processing is required to maintain the link list 100 in memory address order. The link list 100 is not maintained in address order, wherein a freed buffer is added to the beginning (or ending) of the link list 100.

After allocation of long term and short memory blocks and the size queue 40 during startup, the heap 34 comprises the long term allocated blocks from the LT memory 38, short term allocated blocks from the ST memory 38, and the minimum size queues 40. Thereafter, after system startup, the memory manager 30 provides most of the free memory remaining in the heap 34 as cache 44 to the file system, leaving a small reserved amount to a minimum size queues 40 and a small reserved amount to the ST memory 38 for general purpose allocations, thereby entering a performance based memory management mode described below.

In one version, a minimum size queue 40 comprises a minimum number of segments 42 that are maintained in the size queue 40 without reduction. The minimum number can be tuned such that no size queue growth is necessary to achieve desired performance criteria.

Figure 10:
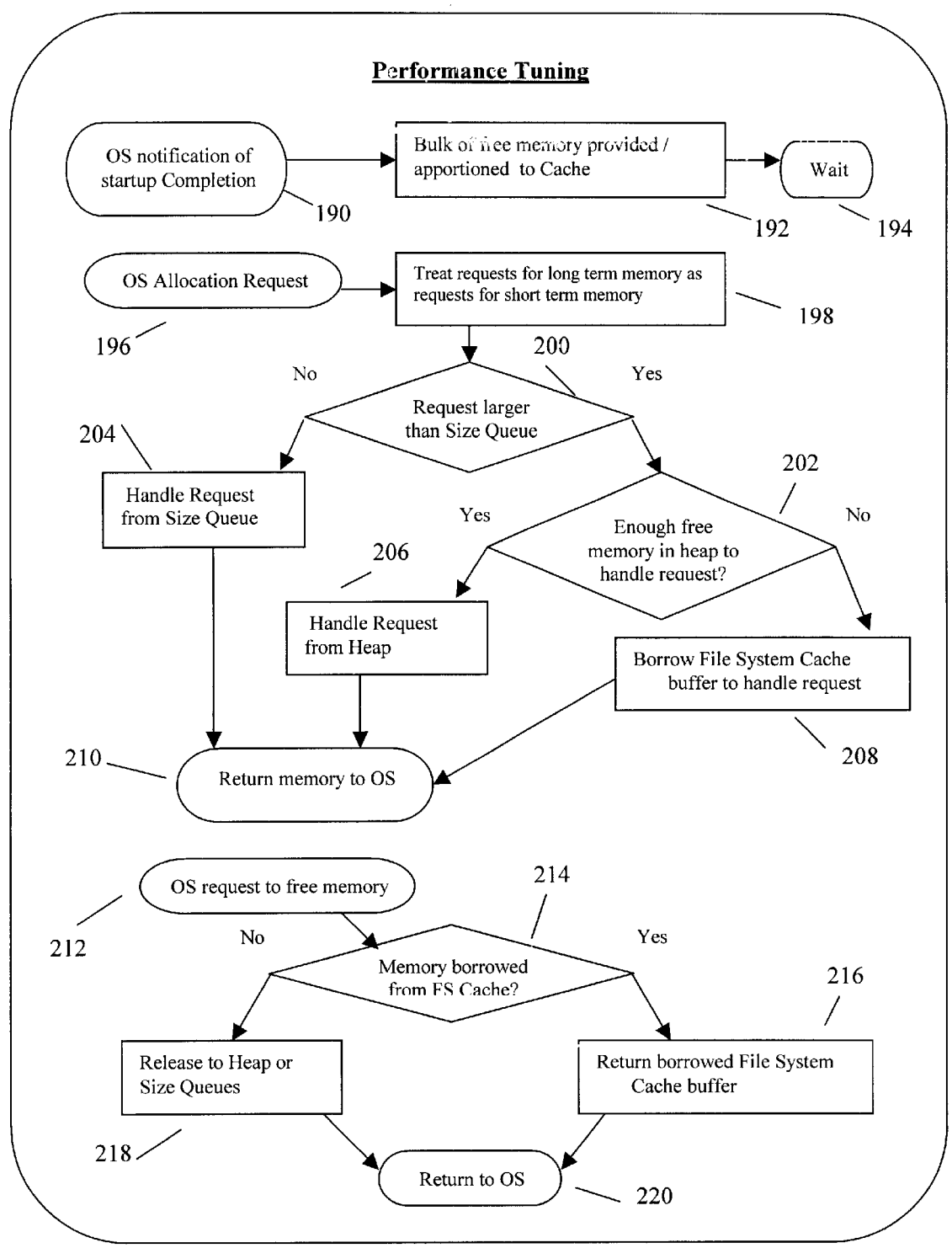

FIG. 10 shows an example flow diagram of an embodiment of step 68 in FIG. 4, for performance based memory management (e.g., tuning) after full system startup/initialization. Upon receiving notification from the operating system that all file server modules have successfully been initialized (step 190), the memory manager 30 completes its initialization whereby all contiguous, free memory, except for small predetermined amounts reserved for the ST memory 38 and size queues 40, is allocated and provided to the file system to be used as the cache 44 including buffers 46 (e.g. 8192 bytes each) (step 192), and the memory manager 30 then awaits requests from the OS (step 194).

Thereafter, upon receiving memory allocation requests (step 196) the memory manager 30 treats requests for long term memory and short term memory allocations alike (step 198), wherein the memory manager 30 determines if a requested memory block size is larger than that available in the segments 42 of the size queues 40 (step 200); if not, allocation requests less than or equal to the largest segment 42 of the size queues 40 (e.g., 1024 bytes) are satisfied from the size queues 40 (step 204). Otherwise, the memory manager 30 then determines if there is sufficient memory in the ST memory 38 of the heap 34 to satisfy the memory allocation request (step 202), and if so, a requested memory block larger than the largest segment 42 of size queues 40 is satisfied from the ST memory 38 (step 206). The ST memory 38 continues to maintain an address position link list 96 and unthreads and rethreads buffers as required (e.g., the same way as described above for the heap 34 in conjunction with FIGS. 6A–B). If sufficient memory is not available in the ST memory 38 to handle a non-size queue request, and if the request is less than a predetermined size (e.g., cache buffer size of 8192 bytes), then a single file system cache buffer 46 is borrowed to satisfy the request (step 208). The borrowed file system cache buffer 46 is not divided into smaller buffers and so is not managed by the block link list 96 or free link list 100 of the ST memory 38. The integrity of the borrowed file system cache buffer 46 is maintained (i.e., the buffer 46 is not divided into smaller portions) to allow returning the borrowed cache buffer 46 to the file system cache 44 as soon as the single allocation is released. Upon satisfying the request, the memory manager 30 then returns the memory address following the allocation header 98 to the OS as the start of the memory allocated to the OS requestor to use for general purpose (step 210).

When the operating system releases a short term memory block allocation (step 212), the memory manager 30 determines if the allocation was satisfied from a borrowed file system cache buffer 46 (step 214), and if so the cache buffer 46 is immediately returned to the file system cache 44 (step 216) to optimize the file system cache 44; otherwise the released memory is returned to the structure that it was allocated from (e.g., the ST memory heap 38 or the size queues 40) as appropriate (step 218). The memory manager 30 then returns to the operating system (step 220).

Figure 11:
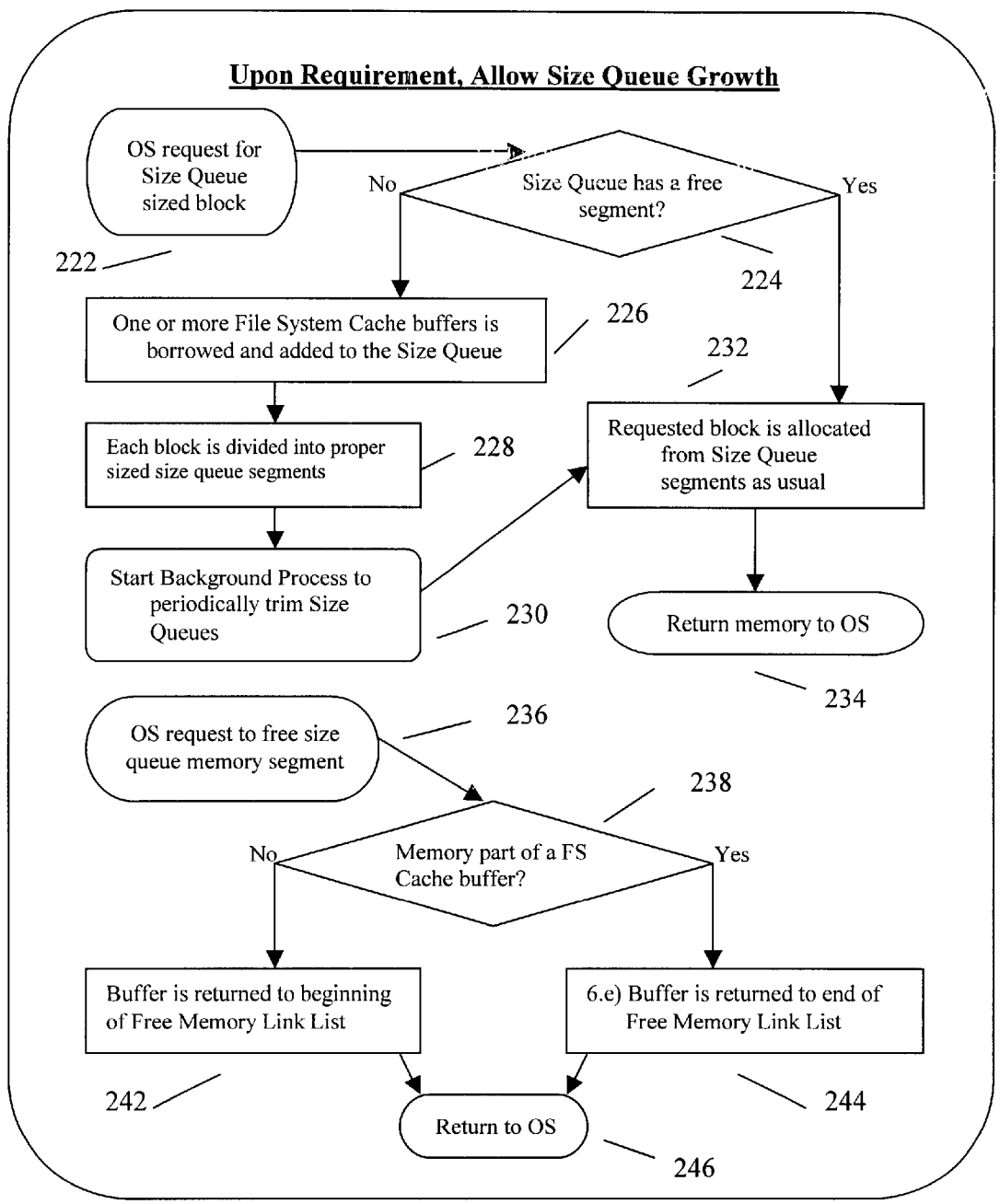

FIG. 11 shows an example flow diagram of an embodiment of step 70 in FIG. 4, for adjusting the size queues 40 in relation to memory requests/requirements. When the operating system requests the allocation of a memory block of a size to be satisfied by a size queue 40 (step 222) (i.e., the memory block size requested is no larger than the largest size queue segment 42), the memory manager 30 determines if a size queue 40 includes a free segment 42 to fulfill the request (step 224). If not, the memory manager 30 "grows" a selected size queue 40 by increasing the number of segments 42 therein. As shown by example in FIG. 6H, one or more file system cache buffers 46 are borrowed and treated as new blocks 97 to be added to the block list 96 of the size queue 40, and each block 97 is initialized to a known value (e.g., 'Q') (step 226). Each new block 97 is then divided into as many segments 42 of the required size for the size queue 40, and an allocation header 98 is created for each segment 42; any remaining memory of the predetermined size (e.g., 8192 bytes) of file system cache buffer 46 remains with the last size queue buffer to be created. For example, in a size queue 40 including segments 42 of size 64 bytes and allocation headers 98 of size 16 bytes, the number of segments 42 generated from the block 97 of 8192 bytes is: 8192/(64+16)=102 segments 42 with 32 bytes left over. The unused 32 bytes remains along with the last segment 42 created, untouched but governed by that last segment's allocation header 98, and accounted for when returned to FS cache 40.

Figure 6I:
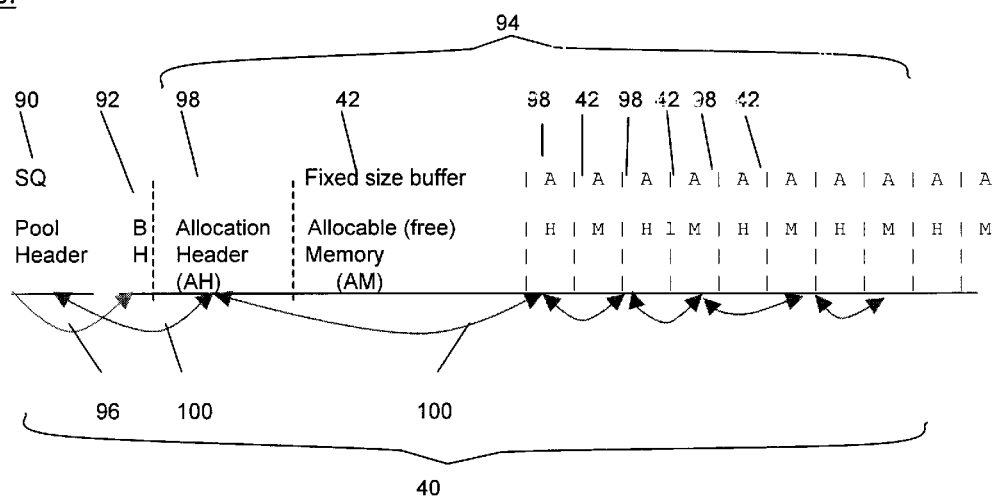
FIGS. 6I–J show another example memory map wherein a size queue (FIG. 6I) grows by borrowing a cache buffer (FIG. 6J)
Figure 6J:
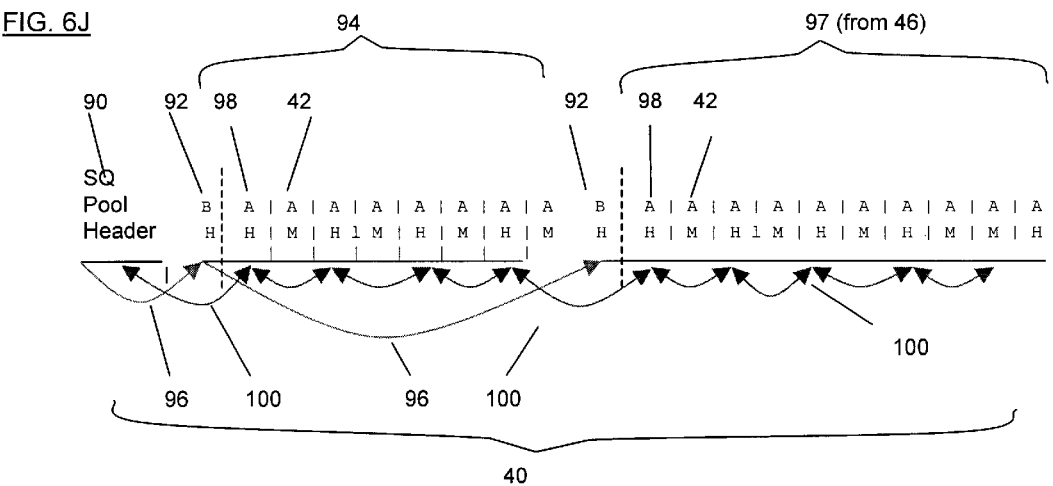

The size queue's free memory link list 100 is updated with the new allocation headers 98 and the new segments 42 (e.g., as described in relation to FIGS. 6A–B); and the size queue pool header 90 is marked as having grown/increased (step 228). FIGS. 6I–J show another example wherein a size queue 40 (FIG. 6I) grows by borrowing a buffer 46 (FIG. 6J). If this is the first growth of a size queue 40 then a background process can be launched to periodically reorganize/trim the size queue 40 and attempt to release file system cache buffers 46 back to the file system (step 230). In satisfying memory requests, the new size queue segments 42 are allocated in the same manner as other size queue segments 42, by taking the first one off the beginning of the size queue link list 100 (step 232). In step 224 above, the selected size queue 40 includes a free segment 42 of sufficient size, wherein that segment 42 is allocated to satisfy the request (step 232). The memory manager 30, then returns the memory address of the segment 42 to the operating system (step 234).

Upon receiving an operating system request to deallocate/free a released size queue segment 42 (step 236), the memory manager 30 determines if the released segment 42 is part of a borrowed file system cache buffer 46 (e.g., a block 97) (step 238). If not, the released segment 42 is returned to the beginning of the free memory link list 100 of the size queue 40 as described above (step 242). Otherwise, the released segment 42 is added to the end of the free memory link list 100 for that size queue 40 (step 244). This ensures that the original size queue segments 42 are used in preference to the segments borrowed from a file system cache buffer 46. As a result, over time, the segments 42 used from borrowed FS cache buffers 46 tend to be free more than the original segments 42 created during size queue initialization. When an optional background trim process searches the size queues 40 for blocks 97 that were borrowed from FS cache 44, all segments 42 of those blocks 97 will more likely be free, therefore, increasing the likelihood that the borrowed block 97 can be trimmed and returned to FS cache 40. The memory manager 30 then returns to the operating system (step 246).

Figure 12:
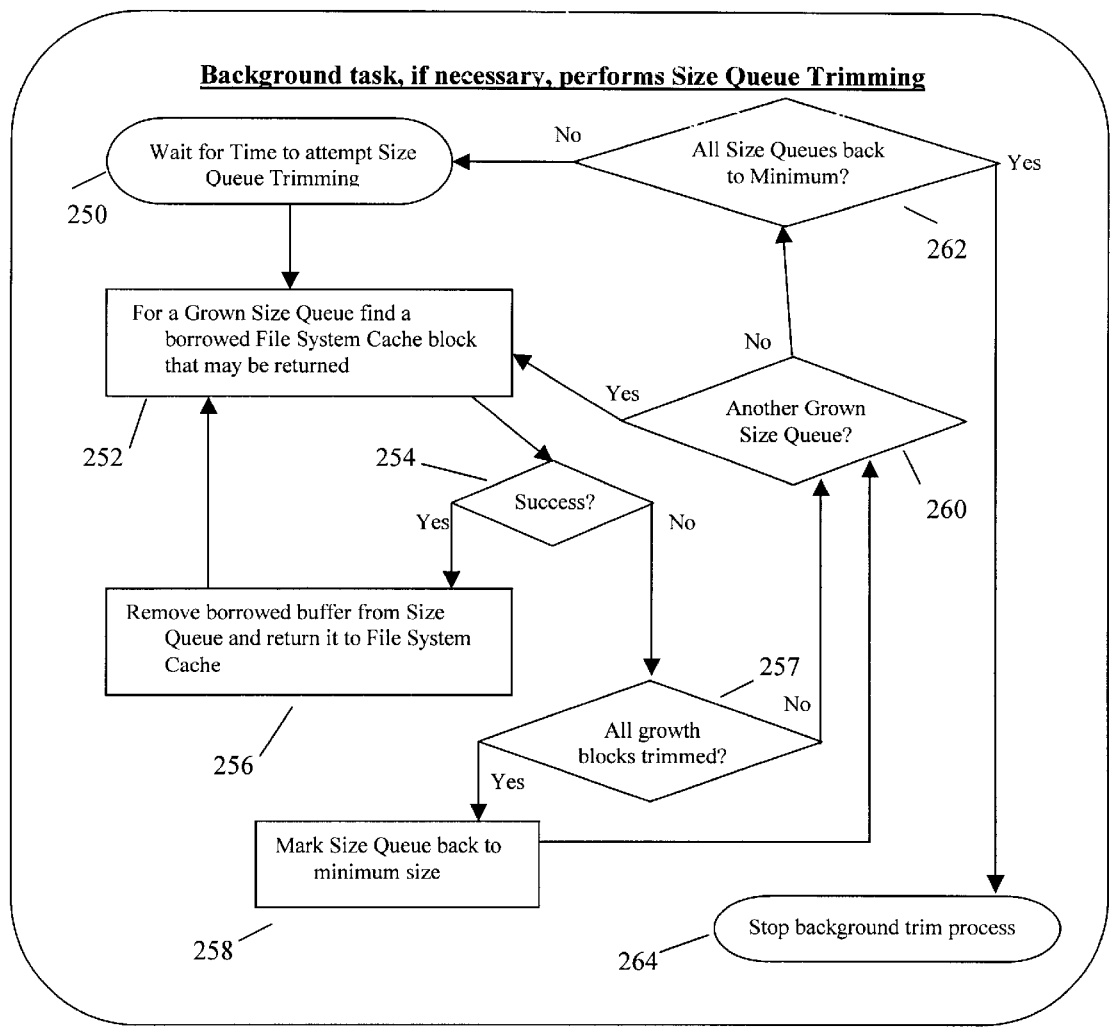

The initial minimum sized size queue 40 represents a single block of memory 94 broken into same sized segments 42. A size queue 40 that has grown includes one or more additional blocks 97 broken into same sized segments. The blocks are linked together by a link list 100 and attached to the size queue's header 90. FIG. 12 shows an example flow diagram of an embodiment of step 72 in FIG. 4, for an optional background process to perform size queue trimming. Once one or more size queues 40 grow as discussed above, a background process can periodically attempt to trim the size queues 40 to return borrowed memory. For each size queue 40 that has grown beyond a minimum established during system startup, the memory manager 30 selects e.g. idle time to begin trimming (or periodically, in order to more aggressively tune in the file server) (step 250), and examines the block link list 96 of the size queue 40 for blocks 97 borrowed from FS cache 44 that can be released from the size queue 40; each block 97 that is marked as having been borrowed from the file system cache 44, is examined to determine if all the size queue segments 42 that the block 97 has been divided into are currently free (step 252). Because the size queue free memory link list 100 is not kept in strict memory address order, it cannot be used to traverse the blocks 97. However, the original size queue segments 42 are always releaded to the beginning of the free link list 100, and new growth segments 42 are always released to the end of the free memory link list 100, while allocations are from the beginning of the link list 100. Over time, the segments 42 borrowed through size queue growth tend to be more likely free than the original segments 42. A block 97 that was borrowed from the file system cache 44 is traversed by examining the known memory offsets therein where allocation headers 98 are located. The memory offsets are easily determined because all segments 42 (with the possible exception of the last in the block 97) are of fixed size.

If all segments 42 within a borrowed block 97 (i.e., file system buffer 46) are free (step 254), the segments 42 are removed from the size queue's free memory link list 100, and the block 97 (buffer 46) is then removed from the size queue's block link list 96 and returned to file system cache 44 (step 256). Otherwise, the memory manager 30 determines if all growth segments 42 have been trimmed (step 257), if so, the size queue pool header 90 is marked to its original minimum size (step 258). Otherwise, the memory manager 30 determines if any other size queue has grown in size (step 260). If so, steps 252–258 can be repeated, otherwise the memory manger 30 determines if all queues 40 are back to minimum (step 262). If not, steps 250–260 can be repeated at an appropriate time. When all size queues 40 have been trimmed back to their original sizes the background process ends (step 264).

In another version, a memory management method according to the present invention can be implemented in a storage system including a central processing unit (CPU), memory and at least one storage device wherein data is transferred to/from the storage device via at least a portion of the memory, wherein the memory management methods are performed by the CPU. The storage system can comprise a network server, wherein the memory manager 30 operates in response to calls made from one or more server resident programs running in the network server, where the server is operating under control of a network operating system including said memory manager 30 comprising system memory allocation functions callable by the one or more server resident programs for making desired memory allocations and deallocations. In addition to the example network filer server in which a memory management method and module/system according to the present invention can be implemented, other examples can include personal digital assistants, routers, subscriber management systems, computer systems with in-memory cache, embedded operating system controlled devices, etc.

Further, the present invention can be implemented in computer systems having one or more of the following characteristics: the computer system includes a closed operating system, with no outside applications running on the computer system; the computer system does not utilize virtual memory; performance and functionality of the computer system are bound by in-memory cache; and/or the computer system encounters varying processing environments and processing/data transfer loads. In an example computer system (e.g., file server) a memory management method according to the present invention includes one or more of the following features: limiting the maximum size of memory requests; efficiently managing RAM memory, especially to reduce fragmentation and increase access speed, essential for better performance; managing competition to maximize in-memory cache without restricting general purpose use memory; and optimizing memory management by self-tuning to adapt to different/varying processing/data transfer requirements.

Limiting memory request size is optional and is useful in computer systems with closed operating systems, or to only a portion of the operating system that is closed (i.e. the kernel, but not the user layer of the OS). Further, the present invention can be implemented in computer system which utilize virtual memory, for efficient RAM management as described. The present invention can be implemented in computer systems/devices which rely upon in-memory cache for maximizing in-memory cache. However, the present invention can be implemented in computer system which do not use in-memory cache. Further, the present invention can be utilized in computer systems wherein the computer system includes closed operating system, or, the memory manager restrict memory requests to within a set size; the amount of in-memory cache has a direct bearing upon performance and/or functionality of the computer system; and/or the number and/or type of operations the computer system performs varies from time to time or from installation to installation.

FIG. 13 shows a block diagram of an example architecture of an embodiment of a computer system 300 in which the present invention can be implemented. The computer system 300 includes one or more computer systems 301, wherein a memory manager according to the present invention can be implemented in one or more of the computer systems 301. A computer system 301 (e.g., network file server) includes a bus 302 or other communication mechanism for communicating information, and a processor 304 (e.g., CPU 24 in FIG. 2A) coupled with the bus 302 for processing information. The computer system 301 also includes a main memory 306, such as a random access memory (RAM) (e.g., memory 26 in FIG. 2A) or other dynamic storage device, coupled to the bus 302. The memory 306 is managed by e.g. the memory manager 30. Further, a portion of the memory 306 is used for storing information and instructions to be executed by the processor 304, and another portion of the memory 306 is used for storing temporary variables or other intermediate information during execution or instructions to be executed by the processor 304. The computer system 301 further includes a read only memory (ROM) 308 or other static storage device coupled to the bus 302 for storing static information and instructions for the processor 304. A storage device 310, such as a magnetic disk (e.g. disk storage 22 in FIG. 2A) or optical disk, is provided and coupled to the bus 302 for storing information and instructions. The bus 302 may contain, for example, thirty-two address lines for addressing the main memory 306 or video memory. The bus 302 can also include, for example, a 32-bit data bus for transferring data between and among the components, such as the CPU 304, the main memory 306 and the storage 310. Alternatively, multiplex data/address lines may be used instead of separate data and address lines.

In one embodiment, the CPU 304 comprises a microprocessor manufactured by Motorola(R) such as 680×0 processor, or a microprocessor manufactured by Intel(R), such as the 80×86, or Pentium(R) processor, or a SPARC(R) microprocessor from Sun Microsystems(R). However, any other suitable microprocessor or microcomputer may be utilized, based on the processing requirements for the computer system 101. The main memory 306 can comprise dynamic random access memory (DRAM). And video memory (not shown) can comprise a dual-ported video random access memory.

The computer system 301 can be coupled via the bus 302 to a display 312, such as a cathode ray tube (CRT), for displaying information to a computer user. An input device 314, including alphanumeric and other keys, is coupled to the bus 302 for communicating information and command selections to the processor 304. Another type or user input device comprises cursor control 316, such as a mousse, a trackball, or cursor direction keys for communicating direction information and command selections to the processor 304 and for controlling cursor movement on the display 312. This input device typically has two degrees of freedom in two axes, a first axis (e.g., x) and a second axis (e.g., y) that allows the device to specify positions in a plane.

According to one embodiment of the invention, the steps of the memory manager 30 described above, is performed by a computer system 301 in response to the processor 304 executing one or more sequences of one or more instructions contained in the main memory 306. Such instructions may be read into the main memory 306 from another computer-readable medium, such as the storage device 310 or floppy disks. Execution of the sequences of instructions contained in the main memory 306 causes the processor 304 to perform the memory management process steps described herein. One or more processors in a multi-processing arrangement may also be employed to execute the sequences of instructions contained in the main memory 306. In alternative embodiments, hare-wired circuitry may be used in place of or in combination with software instructions to implement the invention. Thus, embodiments of the invention are not limited to any specific combination of hardware circuitry and software.

The term "computer-readable medium" as used herein refers to any medium that participated in providing instructions to the processor 304 for execution. Such a medium may take may forms, including but not limited to, non-volatile media, volatile media, and transmission media. Non-volatile media includes, for example, optical or magnetic disks, such as the storage device 310. Volatile media includes dynamic memory, such as the main memory 306. Transmission media includes coaxial cables, copper wire and fiber optics, including the wires that comprise the bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 304 for execution. For example, the instructions may initially be carried on a magnetic disk of a remote computer. The remote computer can load the instructions into its dynamic memory and send the instructions over a telephone line using a modem. A modem local to the computer system 301 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 306, from which the processor 304 retrieves and executes the instructions. The instructions received from the main memory 306 may optionally be stored on the storage device 310 either before or after execution by the processor 304.

The computer system 301 also includes a communication interface 318 (e.g., Ethernet port 28 in FIG. 2A) coupled to bus the 302. The communication interface 318 provides a two-way data communication coupling to a network link 320 that is connected to a local network 322. For example, the communication interface 318 may be an integrated services digital network (ISDN) card or a modern to provide a data communication connection to a corresponding type of telephone line, which can comprise part of the network link 320. As another example, the communication interface 318 may be a local area network (LAN) card to provide a data communication connection to a compatible LAN. Wireless links may also be implemented. In any such implementation, the communication interface 318 sends and receives electrical electromagnetic or optical signals that carry digital data streams representing various types of information. Further, the communication interface 318 can comprise a USB/Tuner and the network link 320 may be an antenna or cable for connecting the computer system 301 to a cable provider, satellite provider or other terrestrial transmission system for receiving messages, data and program code from another source.

The network link 320 typically provides data communication through one or more networks to other data devices.

For example, the network link 320 may provide a connection through the local network 322 to a host computer 324, to one or more client computer 305 (e.g. Client PC 18 or Application Server 16 in FIG. 1), or to data equipment operated by an Internet Service Provider (ISP) 326. The ISP 326 in turn provides data communication services through the world wide packet data communication network now commonly referred to as the "Internet" 328. The local network 322 and the Internet 328 both use electrical, electromagnetic or optical signals that carry digital data streams. The signals through the various networks and the signals on the network link 320 and through the communication interface 318, which carry the digital data to and from the computer system 301, are exemplary forms or carrier waves transporting the information. The computer system 301 can send/receive messages/data, including program code, through the network link 320 and the communication interface 318. The received code may be executed by the processor 304 as it is received, and/or stored in the storage device 310, or other non-volatile storage for later execution. In this manner, the computer systems 301 can obtain application code in the form of a carrier wave.

The example versions of the invention described herein (e.g., memory manager 30) are implemented as logical operations in computing systems 301. The logical operations of the present invention can be implemented as a sequence of steps executing on the computing system 301, and as interconnected machine modules within the computing system 301. The implementation is a matter of choice and can depend on performance of the a computer system 301 and/or network 300, implementing the invention. As such, the logical operations constituting said example versions of the invention are referred to for e.g. as operations, steps or modules.

In this description the term computer system includes the computer system shown and described here, and to logic circuits, dedicated computing devices, etc. The present invention can be implemented in a system comprising a processor (e.g., CPU) and memory. For example, referring to FIG. 13, the present invention can be implemented in a computer system 301 which does not include one or more of the storage device 310, the communication interface 318, the ROM 108, the display 312, the input device 314, and/or the cursor control 316.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for managing memory, comprising the steps of:
   (a) in response to requests for allocation of memory blocks that remain allocated for different durations, allocating each memory block from one of a plurality of regions in the memory based on the duration that the memory block is to remain allocated, such that: (i) in response to requests for allocation of long term memory blocks, long term memory blocks are allocated from a first region of the memory; and (ii) in response to requests for allocation of short term memory blocks, short term memory blocks are allocated from a second region of the memory; and
   (b) maintaining a plurality of memory segments of one or more sizes in the memory, and in response to a request for allocation of a memory block less than a predetermined size, then allocating the requested block from among said segments, otherwise allocating the requested block from another portion of the memory.

2. The method of claim 1, wherein step (b) further comprises the steps of:
   in response to requests for allocation of one or more short term memory blocks less than the predetermined size, then allocating each requested block from among said segments.

3. The method of claim 1, further comprising the steps of limiting the size of each allocated memory block to no more than a predetermined maximum.

4. The method of claim 1, further comprising the steps of changing the number of said data segments in said memory in relation to requests for memory blocks less than the predetermined size.

5. The method of claim 4, further comprising the steps of changing the number of said data segments in said memory in relation to requests for short term memory block allocations less than the predetermined size.

6. The method of claim 4, further comprising the steps of:
   increasing the number of said data segments in said memory in relation to increasing requests for memory; and
   decreasing the number of said data segments in said memory in relation to decreasing requests for memory.

7. The method of claim 1, further comprising the steps of:
   apportioning at least a portion of the memory for maintaining therein at least one or more data buffers.

8. The method of claim 7, wherein the data buffers are for cache use.

9. The method of claim 8, further comprising the steps of using one or more of the data buffers for allocating memory blocks therefrom for non-cache use.

10. The method of claim 9, further comprising the steps of deallocating memory blocks allocated from the cache back to the cache.

11. The method of claim 7, further comprising the steps of changing the number of said data segments in relation to requests for memory less than the predetermined size.

12. The method of claim 11, further comprising the steps of changing the number of said data segments in relation to requests for short term memory block allocations less than the predetermined size.

13. The method of claim 11, further comprising the steps of changing the number of said buffers in substantially inverse proportion to changes in the number of said data segments, in relation to memory requests.

14. The method of claim 7, further comprising the steps of increasing the number of said data segments by allocating one or more data buffers for use as one or more additional data segments in relation to memory requests.

15. The method of claim 14, further comprising the steps of decreasing the number of said data segments by deallocating one or more of said additional data segments back to the data buffers.

16. The method of claim 7, further comprising the steps of:
   in relation to requests for allocation of short term memory blocks, using one or more of the data buffers for allocating short term memory blocks therefrom.

17. The method of claim 16, further comprising the steps of deallocating said short term memory blocks allocated from the data buffers back to the data buffers.

18. A memory manager for a computer system including a central processing unit (CPU) and memory, comprising:

an allocator that allocates memory blocks in response to requests for allocation of memory blocks that remain allocated for different durations, by allocating each memory block from one of a plurality of regions in the memory based on the duration that the memory block is to remain allocated, wherein the allocator: (i) allocates long term memory blocks from a first region of the memory in response to requests for allocation of long term memory blocks, and (ii) allocates short term memory blocks from a second region of the memory in response to requests for allocation of short term memory blocks; and a controller that maintains a plurality of memory segments of one or more sizes in the memory, and in response to a request for allocation of a memory block less than a predetermined size, allocates the requested block from among said segments, otherwise allocates the requested block from another portion of the memory.

19. The memory manager of claim 18, wherein the controller further allocates one or more segments from among said segments in response to requests for allocation of short term memory blocks less than the predetermined size.

20. The memory manager of claim 18, wherein the controller further changes the number of said data segments in said memory in relation to requests for memory blocks less than the predetermined size.

21. The memory manager of claim 18, further comprising an allotter for apportioning at least a portion of the memory for maintaining therein at least one or more data buffers.

22. The memory manager of claim 21, wherein the data buffers are for cache use.

23. The memory manager of claim 22, wherein the allotter further uses one or more of the data buffers for allocating memory blocks therefrom for non-cache use.

24. The memory manager of claim 23, wherein the allotter further deallocates memory blocks allocated from the data buffers back to the data buffers.

25. The memory manager of claim 21 wherein the controller further changes the number of said data segments in relation to requests for memory less than the predetermined size.

26. The memory manager of claim 25, wherein the controller further changes the number of said data segments in relation to requests for short term memory block allocations less than the predetermined size.

27. The memory manager of claim 21, wherein the controller further increases the number of said data segments by allocating one or more data buffers for use as one or more additional data segments in relation to memory requests.

28. The memory manager of claim 27, wherein the controller further decreases the number of said data segments by deallocating one or more of said additional data segments back to the data buffers.

29. The memory manager of claim 21, wherein the allotter further uses one or more of the data buffers for allocating short term memory blocks therefrom in relation to requests for allocation of short term memory blocks.

30. The memory manager of claim 29, wherein the allotter further deallocates said short term memory blocks allocated from the data buffers back to the data buffers.

31. The memory manager of claim 18, wherein the computer system comprises a network file server.

32. A computer program product for use with a computer system including a central processing unit (CPU) and memory for memory management, the computer program product comprising:

a computer-readable medium;

means, provided on the computer-readable medium, for allocation of memory blocks in response to requests for allocation of memory blocks that remain allocated for different durations, by allocating each memory block from one of a plurality of regions in the memory based on the duration that the memory block is to remain allocated, such that long term memory blocks are allocated from a first region of the memory in response to requests for allocation of long term memory blocks, and short term memory blocks are allocated from a second region of the memory in response to requests for allocation of short term memory blocks; and means, provided on the computer-readable medium, for maintaining a plurality of memory segments of one or more sizes in the memory, and in response to a request for allocation of a memory block less than a predetermined size, then allocating the requested block from among said segments, otherwise allocating the requested block from another portion of the memory.

33. The computer program product of claim 32, wherein said means for maintaining the plurality of memory segments further comprises means for changing the number of said data segments in said memory in relation to requests for memory blocks less than the predetermined size.

34. The computer program product of claim 32, further comprising means, provided on the computer-readable medium, for apportioning at least a portion of the memory for maintaining therein at least one or more data buffers for cache use.

35. The computer program product of claim 34, further comprising means, provided on the computer-readable medium, for using one or more of the data buffers for allocating memory blocks therefrom for non-cache use and deallocating memory blocks allocated from the data buffers back to the data buffers.

36. The computer program product of claim 34, wherein said means for maintaining the data segments further includes means for changing the number of said data segments in relation to requests for memory less than the predetermined size.

37. The computer program product of claim 36, wherein said means for maintaining the data segments further includes means for increasing the number of said data segments by allocating one or more data buffers for use as one or more additional data segments and for decreasing the number of said data segments by deallocating one or more of said additional data segments back to the data buffers.

38. The computer program product of claim 34, further comprising means, provided on the computer-readable medium, for using one or more of the data buffers for allocating short term memory blocks therefrom and for deallocating said short term memory blocks allocated from the data buffers back to the data buffers, in relation to requests for allocation of short term memory blocks.

* * * * *